(12) United States Patent  
Ohnishi

(10) Patent No.: US 8,891,147 B2  
(45) Date of Patent: Nov. 18, 2014

(54) OPTICAL BEAM SCANNING DEVICE AND IMAGE DISPLAY DEVICE USING THE SAME

(75) Inventor: Kunikazu Ohnishi, Yokosuka (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 0 days.

(21) Appl. No.: 13/479,492

(22) Filed: May 24, 2012

(65) Prior Publication Data

US 2012/0300276 A1 Nov. 29, 2012

(30) Foreign Application Priority Data

May 27, 2011 (JP) .................................. 2011-118884  
Jul. 29, 2011 (JP) .................................. 2011-166192

(51) Int. Cl.
| | |
|---|---|
| *G02B 26/08* | (2006.01) |
| *G02B 27/00* | (2006.01) |
| *G02B 26/10* | (2006.01) |
| *H04N 9/31* | (2006.01) |

(52) U.S. Cl.  
CPC .......... *H04N 9/3129* (2013.01); *G02B 27/0031* (2013.01); *G02B 26/105* (2013.01); *H04N 9/3185* (2013.01); *G02B 26/101* (2013.01)  
USPC ...................................................... 359/207.2

(58) Field of Classification Search  
CPC ............................ G02B 26/123; G02B 26/125

USPC ........... 359/202.1, 203.1, 205.1, 207.1–207.5  
See application file for complete search history.

(56) References Cited

U.S. PATENT DOCUMENTS

2004/0080799 A1* 4/2004 Ishihara .................... 359/202  
2005/0117188 A1* 6/2005 Ishihara .................... 359/207  
2006/0139718 A1 6/2006 Ishihara

FOREIGN PATENT DOCUMENTS

JP 2006-178346 7/2006

\* cited by examiner

*Primary Examiner* — Euncha Cherry  
(74) *Attorney, Agent, or Firm* — Antonelli, Terry, Stout & Kraus, LLP.

(57) ABSTRACT

In a scanning image display device including a function to project and display a two-dimensional image on a projection screen using a deflecting unit that repeatedly operates a predetermined reflecting mirror surface to two-dimensionally scan a light beam, a large image distortion inevitably occurs, which is caused by the reflecting mirror surface that repeatedly and two-dimensionally operates for deflection. In order to solve the problem, a free-form surface lens or a wedge or trapezoid prism with a predetermined refractive index and a predetermined vertical angle is disposed in an optical path between the deflecting unit and the projection screen, thereby excellently correcting image distortion that occurs when scanning a light beam.

8 Claims, 14 Drawing Sheets

OPTICAL BEAM SCANNING DEVICE AND IMAGE DISPLAY DEVICE USING THE SAME

CLAIM OF PRIORITY

The present application claims priority from Japanese patent applications serial no. JP 2011-118884, filed on May 27, 2011 and serial no. JP 2011-166192, filed on Jul. 29, 2011, the content of which is hereby incorporated by reference into this application.

BACKGROUND OF THE INVENTION (1) Field of the Invention

The present invention relates to an optical beam scanning device, and more particularly to an optical beam scanning device in which a deflecting mirror is rotated to two-dimensionally scan a light beam, thereby projecting and displaying images on a screen or the like.

(2) Description of the Related Arts

In these years, there is proposed an optical beam scanning device (or a scanning image display device) in which a deflecting unit two-dimensionally deflects a light beam emitted from a light source to scan the light beam on a screen and a two-dimensional image is projected and displayed on the screen due to the afterglow effect of the light beam. In such an optical beam scanning device, a rotary mirror deflection device such as a galvano mirror or a MEMS (Micro Electro-Mechanical Systems) mirror is used for a deflecting unit that two-dimensionally deflects a light beam emitted from a light source.

However, in the case where such a rotary mirror deflection device is used to two-dimensionally deflect a light beam, a problem arises in that a slope error occurs in horizontal and vertical scanning directions due to the combination of a rotation angle (a deflection angle) in the horizontal direction and a rotation angle (a deflection angle) in the vertical direction, consequently causing distortion in a two-dimensional image displayed on a screen. Namely, in the optical beam scanning device using the rotary mirror deflection device, a technique that excellently corrects the distortion of a two-dimensional image in association with light beam scanning is necessary in order to display two-dimensional images in high quality.

For example, Japanese Patent Application Laid-Open Publication No. 2006-178346 discloses an optical scanning device for correcting image distortion, including a deflecting unit that deflects a light beam bundle emitted from a light source unit in a first scanning direction and a second scanning direction orthogonal to the first scanning direction, and a scanning optical system that guides the deflected light beam bundle to a scan surface. The deflecting unit includes a deflector that operates on sine waves in the first scanning direction. A single optical surface constituting the scanning optical system has a shape in which a second-order derivative in the first scanning direction changes in a direction in which the deflected light beam bundle diverges from the center to the rim in the first scanning direction, and the shapes are arranged in the second scanning direction.

SUMMARY OF THE INVENTION

Although such a conventional correcting unit as disclosed in Japanese Patent Application Laid-Open Publication No. 2006-178346 is effective for correcting scanning distortion, the correcting unit needs three optical surfaces (reflection surfaces or lens surfaces) having a free-form surface shape as a scanning optical system for correcting distortion, inevitably causing the upsizing or complication of the device.

In view of the situations described above, the present invention is to provide an optical beam scanning device that implements image distortion correction with a very simple optical system configuration and an image display device using the same.

The object can be achieved by the appended claims.

According to the present invention, it is possible to implement an optical beam scanning device that can excellently correct image distortion using a small-sized, very simple optical element and an image display device using the same.

BRIEF DESCRIPTION OF THE INVENTION

The present invention will become fully understood from the detailed description given hereinafter and the accompanying drawings, wherein.

Figure 15:
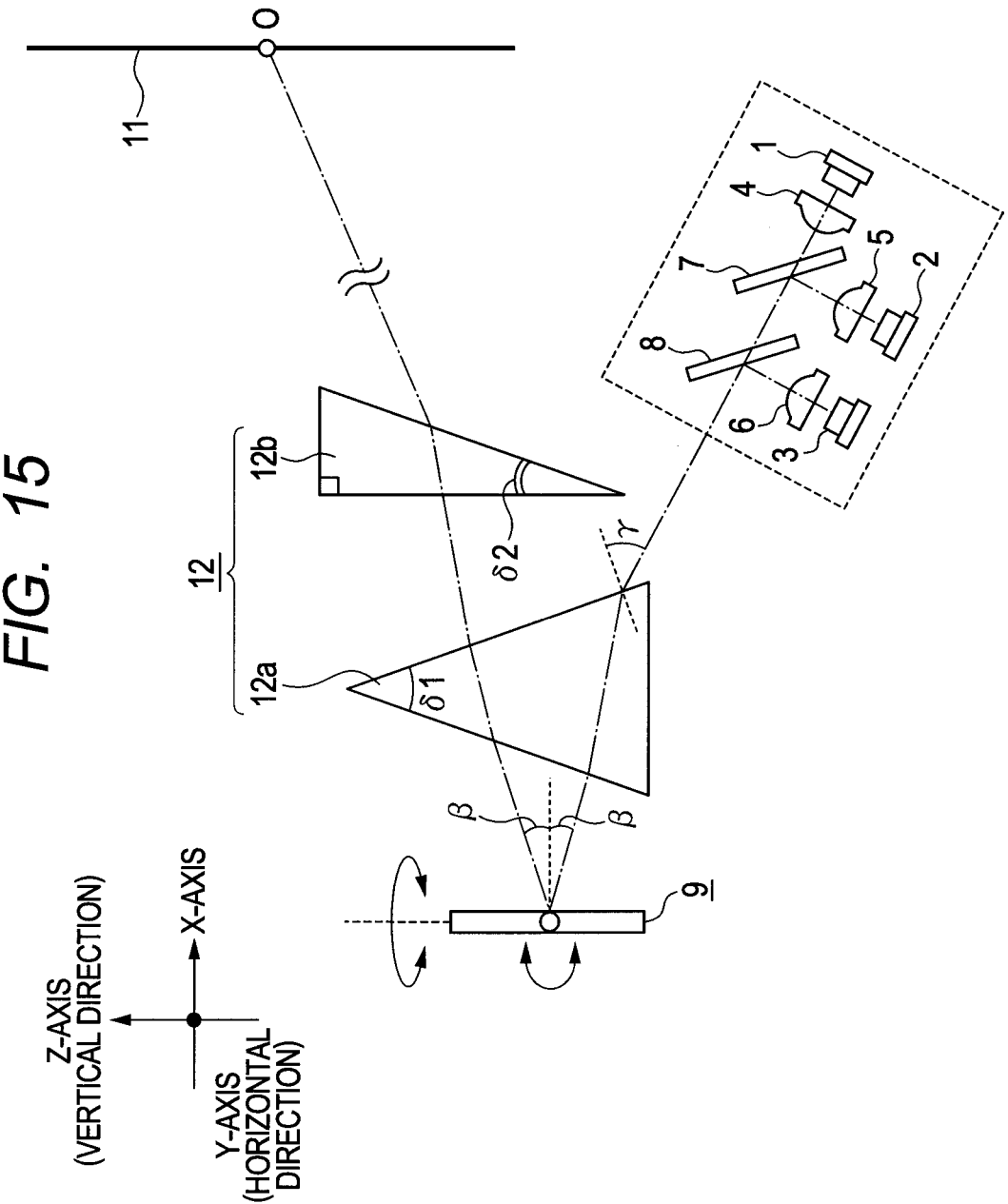
Figure 16:
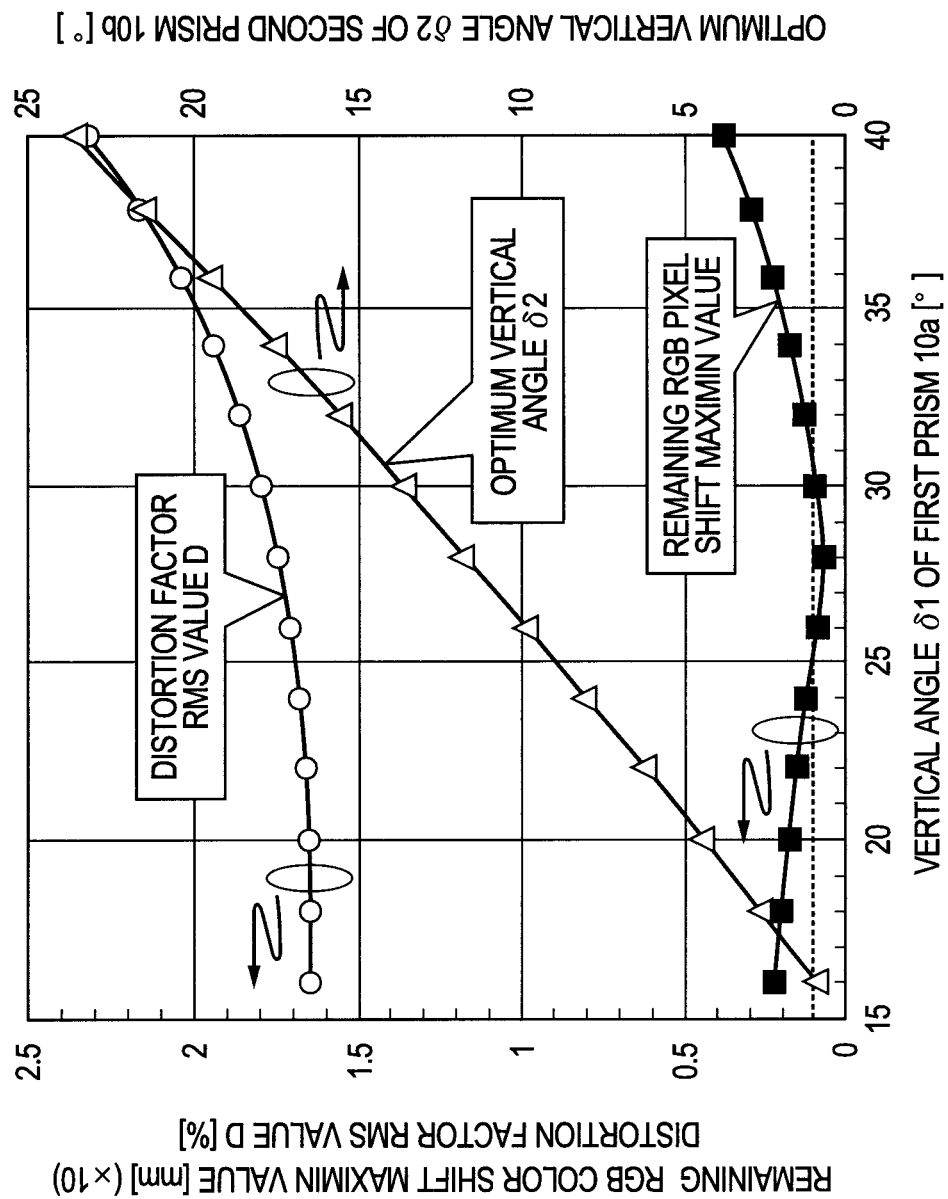

FIG. 15 is a schematic side view illustrating a sixth embodiment of an image distortion correcting prism according to the present invention and an optical beam scanning image display device mounted with the image distortion correcting prism; and FIG. 16 is a diagram illustrating a specific example of the combination of the vertical angles of wedge prisms according to the sixth embodiment of the present invention and an exemplary optical performance such as image distortion correction performance.

DETAILED DESCRIPTION OF THE PREFERRED EMBODIMENTS

In the following, embodiments of the present invention will be described with reference to the drawings.

First Embodiment

Figure 1:
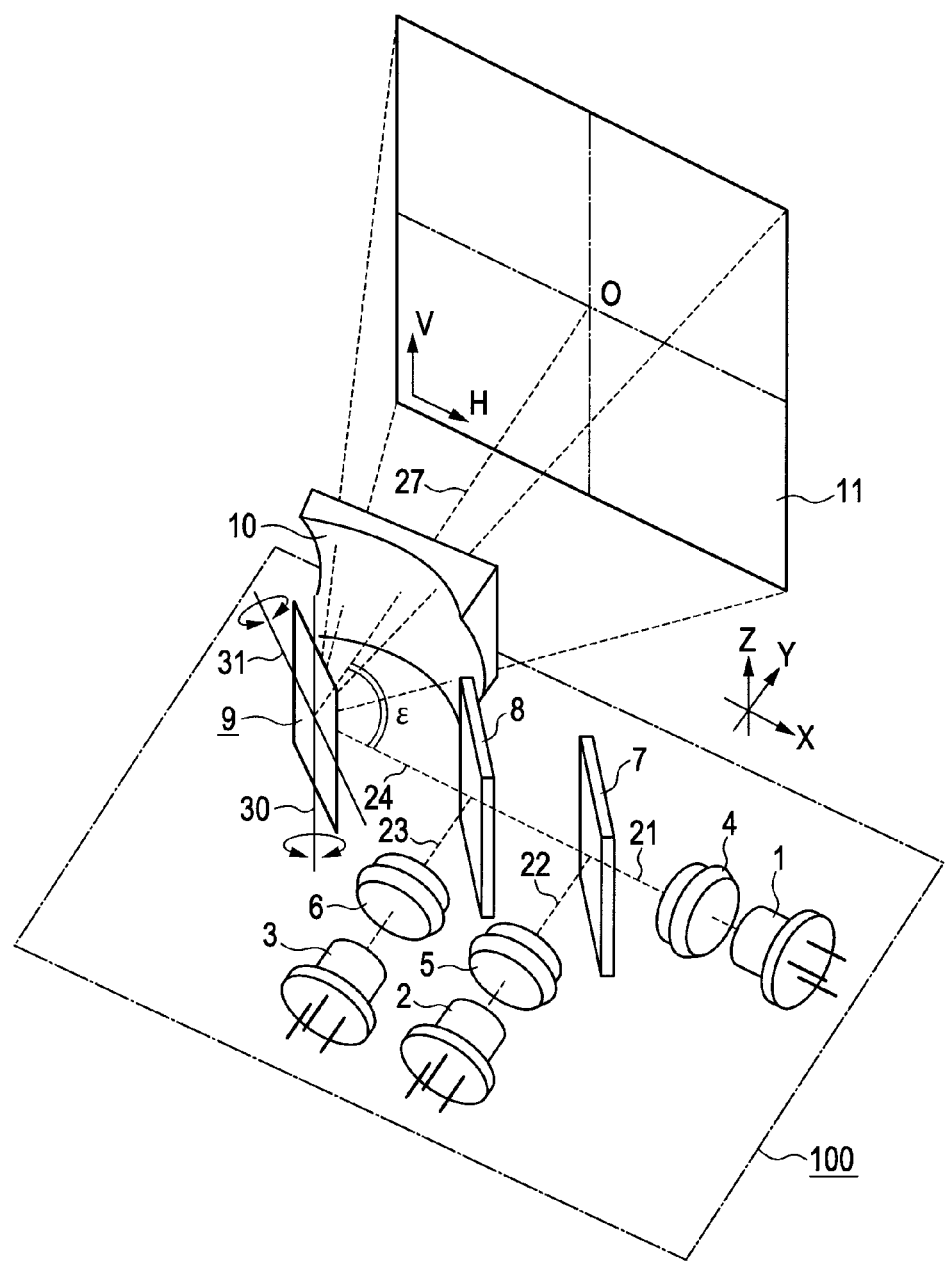
FIG. 1 is a perspective view illustrating a first embodiment of an optical beam scanning device according to the present invention.

FIG. 1 is a perspective view illustrating a first embodiment of an optical beam scanning device according to the present invention. The configuration of a light beam scanning device 100 will be described.

A laser light source 1 emits a green light beam in a waveband of 520 nm, for example, and the emitted green light beam is converted into a nearly collimated light beam 21 at a collimating lens 4. A laser light source 2 emits a red light beam in a waveband of 640 nm, for example, and the emitted red light beam is converted into a nearly collimated light beam 22 at a collimating lens 5. A laser light source 3 emits a blue light beam in a waveband of 440 nm, for example, and the emitted red light beam is converted into a nearly collimated light beam 23 at a collimating lens 6. The laser light sources 1, 2, and 3 emit the light beams with intensity corresponding to signals of individual color components of image signals.

A wavelength selective mirror 7 transmits the green light beam 21, and reflects the red light beam 22. A wavelength selective mirror 8 transmits the green light beam 21 and the red light beam 22, and reflects the blue light beam 23. The light beams 21, 22, and 23 transmitted through or reflected at the wavelength selective mirrors 7 and 8 are combined in a single light beam 24 for traveling. In this combining, the slopes and positions of the optical axes of the light beams are adjusted in such a way that the cross sections of the light beam bundles of the light beams are laid with each other. The combined light beam 24 enters a deflecting mirror device 9 for light beam scanning.

The deflecting mirror device 9 includes a single reflecting mirror (in the following, referred to as a deflecting mirror) that reflects the incident light beam 24 and a driving mechanism (not shown) that two-dimensionally rotates and drives the deflecting mirror, in which the incident light beam 24 is converted into a reflected light beam 27 and the light beam 27 is projected on a screen 11 apart from a predetermined distance. The driving mechanism causes the deflecting mirror to periodically and repeatedly rotate about a rotation axis 30 nearly parallel with a Z-axis in FIG. 1 and a rotation axis 31 nearly parallel with an X-Y plane at a predetermined angle (a deflection angle) about each axis. The deflecting mirror device 9 in this configuration is called a biaxial single-plane deflecting mirror device, and this configuration is advantageous in a viewpoint of the downsizing of the optical beam scanning device or the reduction in the number of optical parts. The deflecting mirror device 9 can be configured using an MEMS mirror, a galvano mirror, or the like, for example.

In this embodiment, the optical axis of the incident light beam 24 is set nearly orthogonal to the optical axis of the reflected light beam 27 in such a way that the optical axis of the reflected light beam 27 is nearly in the Y-axis direction when the optical axis of the incident light beam 24 to the deflecting mirror device 9 is set in the X-axis direction. Namely, an angle $\epsilon$ formed by the two light beams 24 and 27 is about an angle of 90° in a state in which the reflected light beam 27 is projected at the center position (the origin point of scanning) on the screen 11. In other words, the incident angle of the incident light beam 24 to the deflecting mirror surface in the deflecting mirror device 9 (an angle formed by the incident light beam 24 and the normal direction of the deflecting mirror surface) is set to $\epsilon/2$=an angle of about 45°. As described above, the optical axis of the incident light beam 24 to the deflecting mirror device 9 and the optical axis of the reflected light beam 27 are made nearly orthogonal to each other, whereby it is possible to simplify the configuration and downsize the optical beam scanning device 100.

The reflected light beam 27 projected from the deflecting mirror device 9 to the screen 11 is two-dimensionally scanned on the screen 11 in the horizontal direction (an H-axis direction) and the vertical direction (a V-axis direction). In this scanning, the optical outputs of the laser light sources 1, 2, and 3 are independently modulated in synchronization with the scan position of the reflected light beam 27 on the screen 11, whereby a two-dimensional color image is displayed on the screen 11 using the afterglow phenomenon of human eyes.

In this embodiment, a free-form surface lens 10 is disposed in the optical path of the reflected light beam 27 between the deflecting mirror device 9 and the screen 11 as a scanning distortion correcting unit to reduce scanning distortion. The free-form surface lens 10 is a lens in a shape with a predetermined aspheric surface shape asymmetric to the center of the optical axis. In the following, this shape is called "a free-form surface". As described above, in this embodiment, scanning distortion is corrected using a single optical element called the free-form surface lens 10, and it is possible to implement the downsizing and cost reduction of the device.

Next, the function of the free-form surface lens 10 as a scanning distortion correcting unit will be described.

First, scanning distortion that occurs in a conventional optical beam scanning device will be described. In the case where the light beam 27 reflected from the deflecting mirror device 9 is directly projected on the screen 11, scanning distortion occurs in an image to be displayed when two-dimensionally scanning the light beam 27 on the screen.

Figure 2A:
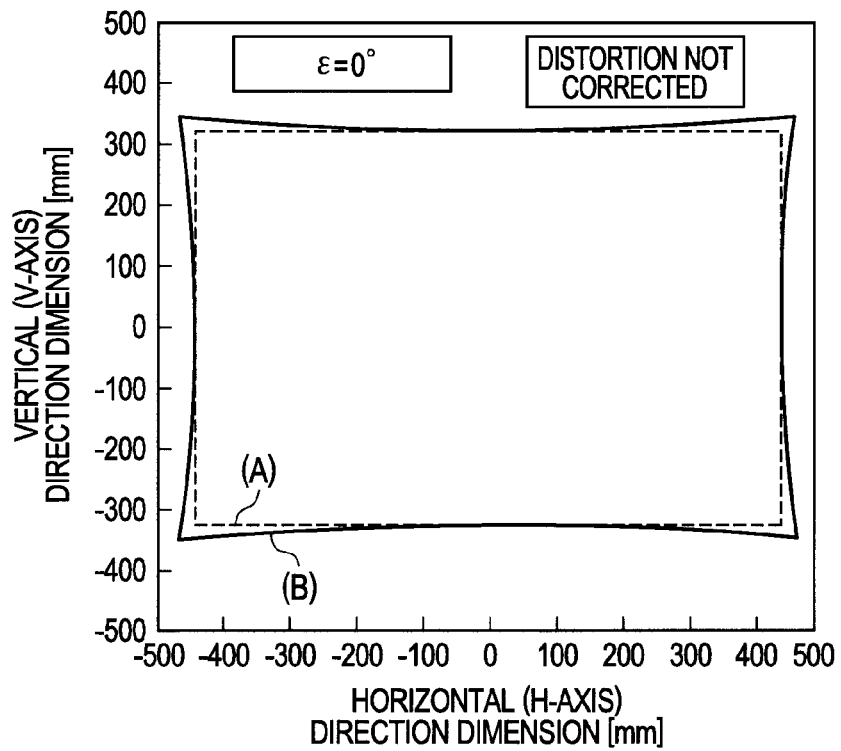
FIG. 2A is a diagram illustrating an example of scanning distortion that occurs in a conventional optical beam scanning device ($\epsilon=0°$)
Figure 2B:
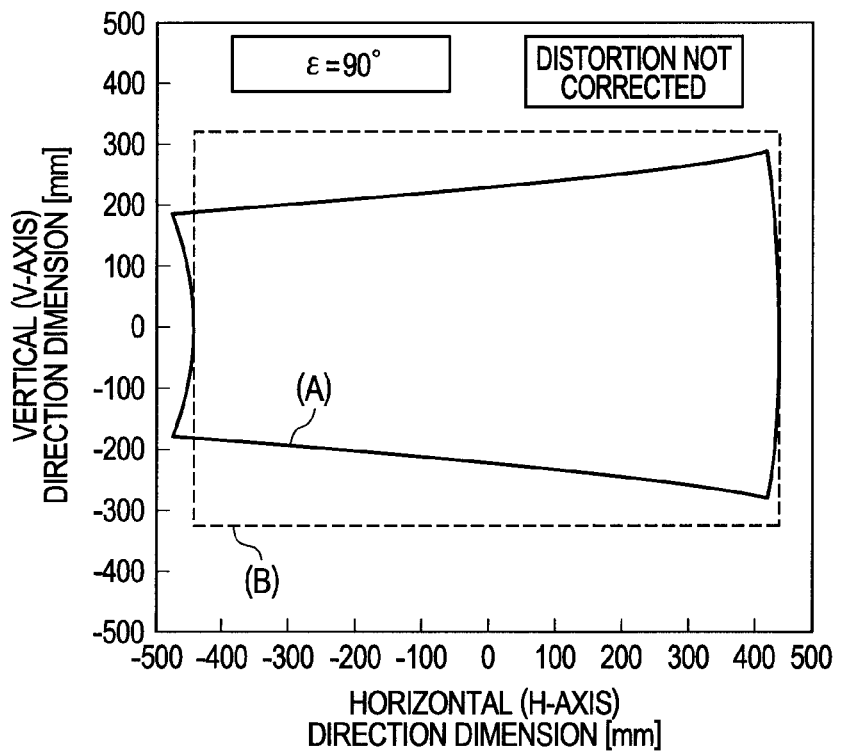
FIG. 2B is a diagram illustrating an example of scanning distortion that occurs in a conventional optical beam scanning device ($\epsilon=90°$)

FIGS. 2A and 2B are diagrams illustrating an example of scanning distortion that occurs in a conventional optical beam scanning device. A deflecting mirror device 9 repeatedly rotates a deflecting mirror at deflection angles, a maximum angle of ±12° in the horizontal direction and a maximum angle of ±9° in the vertical direction. A test rectangular frame image is displayed on a screen 11 at a position about one meter apart from the deflecting mirror device 9. The horizontal axis expresses a dimension in the horizontal direction (the H-axis direction illustrated in FIG. 1), and the vertical axis expresses a dimension in the vertical direction (the V-axis direction illustrated in FIG. 1).

FIG. 2A illustrates the case of the angle $\epsilon$=0°, which is formed by the optical axis of an incident light beam 24 to the deflecting mirror device 9 and the optical axis of a reflected light beam 27 at the origin point of scanning. FIG. 2B illustrates the case of the angle $\epsilon$=90°, which is formed by the optical axis of the incident light beam 24 to the deflecting mirror device 9 and the optical axis of the reflected light beam 27 at the origin point of scanning. In FIGS. 2A and 2B, a frame indicated by a broken line with a symbol A is an image in a correct rectangular frame originally displayed, whereas a frame indicated by a solid line with a symbol B is a rectangular frame image actually displayed.

As apparent from FIGS. 2A and 2B, image distortion occurs in the image B actually displayed on the screen 11, whereas image distortion does not occur in the correct image A originally displayed. The occurrence of scanning distortion is caused by a shift in the three-dimensional incident angle of the incident light beam to the deflecting mirror surface from a desired angle when simultaneously combining rotation in the horizontal direction and rotation in the vertical direction on the deflecting mirror, and scanning distortion is an inevitable phenomenon in an optical beam scanning device using a deflecting mirror. When comparing FIG. 2A with FIG. 2B, the amount of scanning distortion to occur depends on the angle $\epsilon$ formed by the optical axis of the incident light beam 24 and the optical axis of the reflected light beam 27 (or the incident angle $\epsilon/2$ to the deflecting mirror surface); the distortion amount is increased in the case of $\epsilon=90°$, and the distortion amount is asymmetric in the lateral direction, causing a noticeable distortion in the vertical width on the left side of the image, as illustrated in FIG. 2B.

Next, the lens surface shape of the free-form surface lens 10 for correcting scanning distortion will be described.

Figure 3:
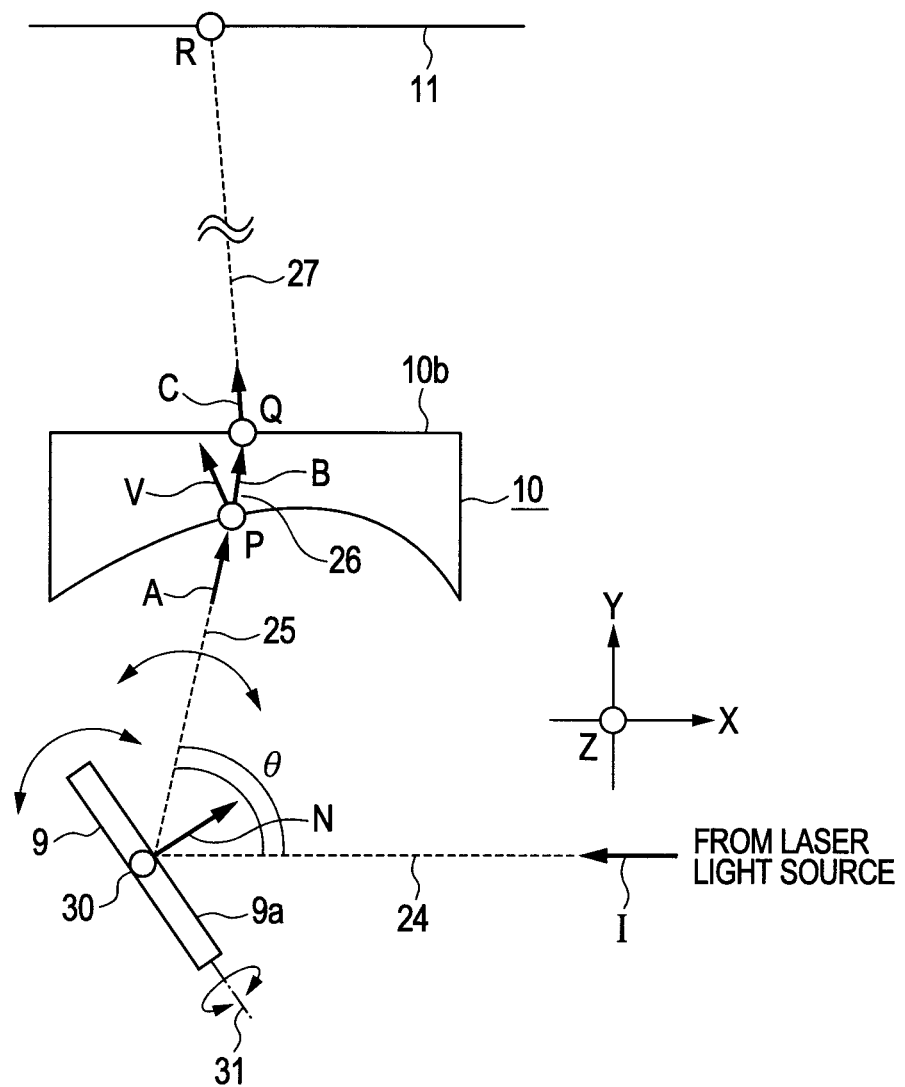
FIG. 3 is a diagram illustrating an analytic model for designing the lens surface shape of a free-form surface lens 10.

FIG. 3 is a diagram illustrating an analytic model for designing the lens surface shape of the free-form surface lens 10. FIG. 3 illustrates the deflecting mirror device 9, the free-form surface lens 10, and the screen 11, which are main components for analysis, and the same components as those in FIG. 1 are designated the identical reference numbers. It is noted that light beams are distinguished as a light beam from the deflecting mirror device 9 to the free-form surface lens 10 is denoted by a reference numeral 25, a light beam in the free-form surface lens 10 is denoted by a reference numeral 26, and a light beam from the free-form surface lens 10 to the screen 11 is denoted by a reference numeral 27.

First, suppose that the light beam vector of the light beam 24 entering the deflecting mirror device 9 from the laser light source side (a unit vector expressing the traveling direction of the light beam; the same thing is applied to light beam vectors described below) is I. Suppose that the plane normal vector (a unit vector) of a deflecting mirror surface 9a of the deflecting mirror device 9 is N. In the deflecting mirror device 9, the deflecting mirror is caused to repeatedly operate and rotate about the rotation axes 30 and 31 vertical to each other. The plane normal vector N from the deflecting mirror surface 9a is determined from the rotation angles of this deflecting mirror. A light beam vector A of the light beam 25 that is reflected from the deflecting mirror device 9 and goes to the free-form surface lens 10 is expressed by Equation (1) according to a basic equation for reflection $$A = I - 2 \cdot (I*N) \cdot N \qquad (1)$$

where in Equation (1), the vectors are three-dimensional vectors, the symbol "·" expresses a simple scalar product, and "*" expresses the inner product of the vector. The similar description will be given to equations below.

From Equation (1), the relationship between the light beam vector I of the incident light beam 24 to the deflecting mirror device 9 and the light beam vector A of the reflected light beam 25 is found, and a solid angle θ formed by the two light beam vectors is determined. It is noted that although the solid angle θ determined at this time is drawn as the solid angle θ is formed in a plane parallel with the X-Y plane (that is, a paper surface) in FIG. 3 for simplicity, the solid angle θ is of course actually a solid angle in a three-dimensional space including the Z-direction.

Subsequently, the light beam 25 expressed by the light beam vector A reflected at the deflecting mirror device 9 goes to the free-form surface lens 10, and enters a point P on an incident surface 10a. In the example illustrated in FIG. 3, this incident surface 10a has a free-form surface shape. Suppose that the plane normal vector at the point P on the incident surface 10a is V. In the design of the free-form surface lens 10, this vector V is to be found. However, the vector V is unknown at this point in time. Moreover, suppose that the refractive index of the free-form surface lens 10 is n. A light beam vector B of the light beam 26 that is refracted at the point P and travels in the lens 10 is expressed by Equation (2) according to a basic equation for refraction.

$$B = -V \cdot \{1 - (1/n)^2 \cdot [1 - (A*V)^2]\}^{(1/2)} + (1/n) \cdot [A - (A*V) \cdot V] \qquad (2)$$

Subsequently, the light beam 26 that travels in the free-form surface lens 10 and is expressed by the light beam vector B reaches a point Q on a light emitting surface 10b of the lens 10. Suppose that the plane normal vector of the light emitting surface 10b at the point Q is W (not shown). A light beam vector C of the light beam 27 that is again refracted at the point Q and goes out the free-form surface lens 10 is expressed by Equation (3) according to a basic equation for refraction.

$$C = -W \cdot \{1 - n^2 \cdot [1 - (B*W)^2]\}^{(1/2)} + n \cdot [B - (B*W) \cdot W] \qquad (3)$$

Here, given that the light emitting surface 10b is a plane parallel with the X-axis in FIG. 3 for simplicity. Then, the XYZ components of the plane normal vector W at the point Q on the light emitting surface 10b are (0, 1, 0).

Therefore, from Equations (1), (2), and (3), the light beam vector C of the light beam 27 that goes out the free-form surface lens 10 and goes toward the screen 11 is found by the light beam vector I entering the deflecting mirror device 9, the plane normal vector N from the deflecting mirror surface 9a of the deflecting mirror device 9, the plane normal vector V at the incident point P on the incident surface 10a of the free-form surface lens 10, and the refractive index n of the lens. If this light beam vector C is found, a position R on the screen 11 is also found, at which the light beam 27 traveling along the light beam vector C arrives.

Here, in an ideal scanning state without scanning distortion, the relationship between the rotation angle (that is, the plane normal vector N from the deflecting mirror surface 9a of the deflecting mirror device 9) given to the rotation axes 30 and 31 of the deflecting mirror device 9 and the coordinates of a target point R at which the light beam 27 arrives on the screen 11 (that is, the light beam vector C of the light beam 27) is separately defined. Thus, the numeric values of the plane normal vector N and the light beam vector C in the ideal state are substituted into Equations (1), (2), and (3), and the plane normal vector V from the free-form surface 10a is calculated backward so as to satisfy these equations. Therefore, the plane normal vector V at the corresponding incident point P on the free-form surface lens 10 to a given target point R on the screen 11 (that is, the slope value of the incident surface 10a, which is a free-form surface) can be found. Then, if the coordinates of the target point R on the screen 11 and the conditions of the rotation angles of the deflecting mirror device 9 for the coordinates are in turn given, the slope value at the corresponding incident point on the free-form surface lens 10 can be in turn obtained. These slope values are in turn integrated as the scan center of the screen 11 is the origin point, whereby the shape of the incident surface 10a of the free-form surface lens 10 can be finally determined.

TABLE 1

| | radius of curvature R [mm] | cone constant K | non-linear aspheric coefficient | | | | eccentricity value Δ [mm] |
|---|---|---|---|---|---|---|---|
| | | | $X \cdot Z^2$ | $X \cdot Z^4$ | $X^2 \cdot Z^4$ | $X^4 \cdot Z^2$ | |
| X-Y cross section | −10.0 | −1.0 | 0.0 | 0.0 | 0.0 | 0.0 | −3.8 (X-axis direction) |
| Y-Z cross section | −26.0 | −1.0 | −0.003 | 0.0 | 0.0 | 0.0 | |

Figure 4:
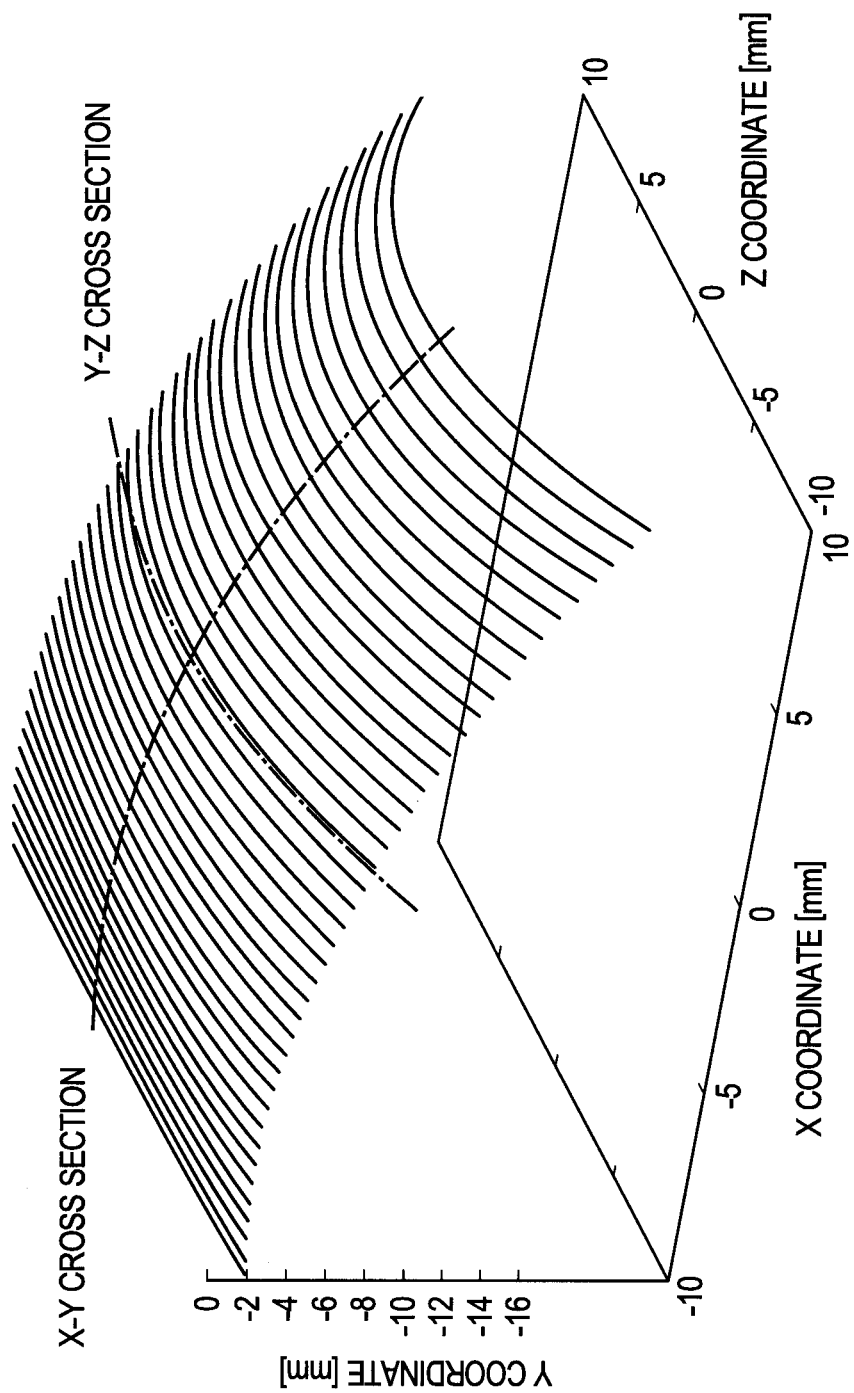
FIG. 4 is a diagram illustrating the shape of an incident surface of the free-form surface lens 10 three-dimensionally geometrized.

Table 1 shows a specific example of the shape of an incident surface of the free-form surface lens 10 found according to the aforementioned procedures. Moreover, FIG. 4 illustrates a three-dimensionally geometrized shape of a free-form surface expressed by coefficient values shown in Table 1.

In Table 1, for the coefficient values of the curved surface shape of the free-form surface lens 10, the radius of curvature, a cone constant, an aspheric constant, and so on are expressed according to the notation of the lens surface of an aspherical lens. The numeric values in the upper row express the data of the cross sectional shape in the case where the curved surface 10a is cut in the X-Y plane in FIG. 4, and the numeric values in the lower row express the data of the cross sectional shape in the case where the curved surface 10a is cut in the Y-Z plane. As described above, the curved surface 10a has a curved surface shape with different curvatures in the longitudinal section (a Y-Z cross section) and the transverse cross section (an X-Y cross section), and such a shape is called an anamorphic shape.

On the other hand, the eccentricity value in the right column expresses a distance that an axially symmetric cross section determined by the radius of curvature, the cone constant, and the aspheric constant is decentered along the X-axis. The existence of the term of the eccentricity shows that the found curved surface is asymmetric to the center of the optical axis passing through the origin point in the X-axis direction. This asymmetry is the characteristic of the free-form surface lens 10 according to this embodiment, and is effective for correcting scanning distortion that occurs in lateral asymmetry.

Figure 5:
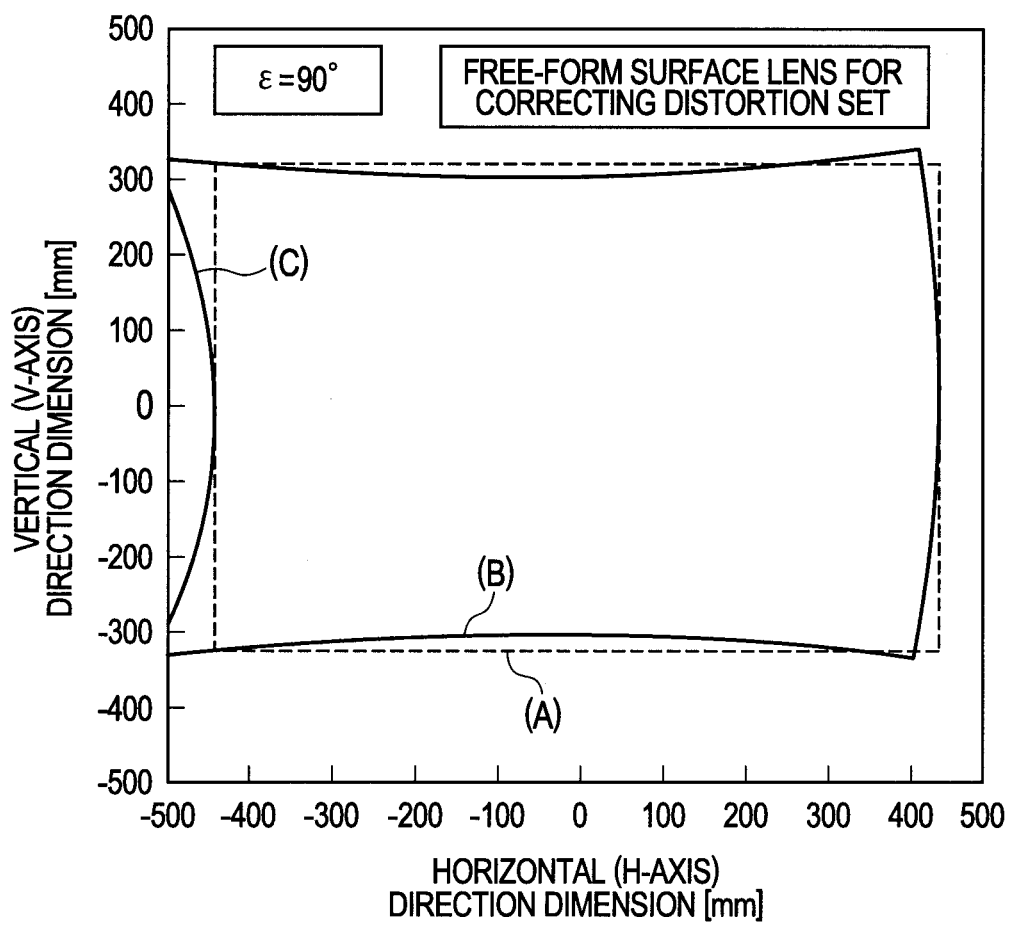
FIG. 5 is a diagram illustrating the effect of reducing scanning distortion using the free-form surface lens 10.

FIG. 5 is a diagram illustrating the effect of reducing scanning distortion using the free-form surface lens 10. FIG. 5 illustrates a rectangular frame image displayed on the screen in the case where the free-form surface lens 10 shown in Table 1 and FIG. 4 is disposed in the optical beam scanning device. The projection condition is the same as in FIG. 2B (ε=90°), in which a frame indicated by a broken line with a symbol A is a rectangular frame image originally displayed, and a frame indicated by a solid line with a symbol B is a rectangular frame image actually displayed.

When comparing the result in FIG. 5 with the result in FIG. 2B without correcting scanning distortion, it is revealed that providing the free-form surface lens 10 can excellently reduce scanning distortion and can almost eliminate distortion in the vertical width in lateral asymmetry observed in FIG. 2B.

It is noted that in the free-form surface lens 10 described with reference to FIGS. 3 and 4 and Table 1, only the incident surface 10a for the light beam is formed in the free-form surface and the light emitting surface 10b for the light beam is formed in a flat shape. The free-form surface lens 10 is not limited to this shape. The light emitting surface 10b is formed in a free-form surface shape, whereby it is possible to further reduce scanning distortion and perform more ideal correction.

Moreover, it is also possible to excellently suppress a so-called color aberration due to the wavelength dependence of the refractive index of a glass material by combining a plurality of free-form surface lenses prepared using glass materials with a refractive index or a refractive index distribution value different from each other.

It is noted that in the example illustrated in FIG. 5, although distortion in the vertical width in lateral asymmetry is excellently reduced, lateral distortion expressed by a symbol C (that is, distortion on the straight line in the vertical direction) still considerably remains. This remaining lateral distortion can be eliminated in which the light emitting surface 10b side of the lens is also formed in a free-form surface shape as described above and a higher-order term is added to the coefficients of the curved surface shape of the lens.

On the other hand, it is also possible to excellently eliminate such a lateral distortion (distortion on the straight line in the vertical direction) by electrical processing. In the optical beam scanning device, the optical outputs of the laser light sources are independently modulated in synchronization with the mirror deflecting operation of the deflecting mirror device 9. Therefore, the timing of modulating optical outputs is shifted by a period of time corresponding to the lateral distortion while scanning the light beam in the horizontal direction. The shift value of timing is made variable according to the position on the screen in the vertical direction, whereby it is possible to eliminate the lateral distortion of an image actually observed.

In this embodiment, the case is described where the angle formed by the incident light beam 24 to the deflecting mirror device 9 and the reflected light beam 27 is an angle of 90°. However, this embodiment is not limited to this angle. Although the degree of scanning distortion that occurs according to the size of the angle is changed, it is possible to similarly reduce this scanning distortion by providing the free-form surface lens 10 in any case.

Moreover, in the aforementioned embodiment, the deflecting mirror device 9 is a biaxial single-plane deflecting mirror device in which a single deflecting mirror is caused to operate and rotate about two rotation axes vertical to each other. However, this embodiment is not limited thereto. For example, scanning distortion similarly occurs also in a uniaxial two-plane deflecting mirror device including two deflecting mirrors with a rotation axis almost vertical to each other in which an incident light beam is in turn reflected at these two deflecting mirrors. Thus, the free-form surface lens 10 according to this embodiment can be similarly applied to this device.

As described above, according to this embodiment, it is possible to excellently correct scanning distortion using a single optical element, which is the free-form surface lens 10, and it is possible to implement a small-sized optical beam scanning device that displays two-dimensional images in high quality at low cost.

Second Embodiment

Figure 6:
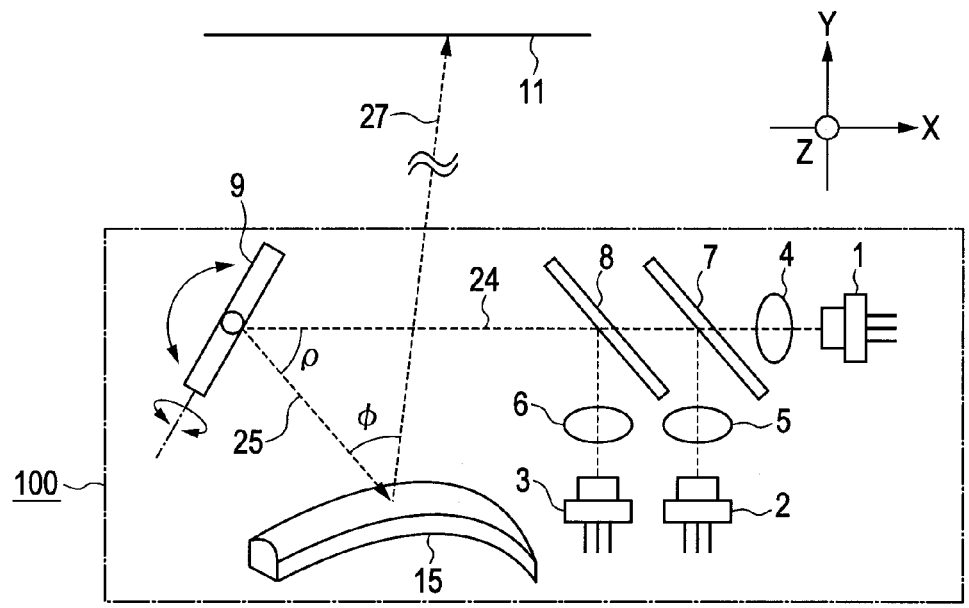
FIG. 6 is a plan view illustrating a second embodiment of an optical beam scanning device according to the present invention.

FIG. 6 is a plan view illustrating a second embodiment of an optical beam scanning device according to the present invention. In the first embodiment (FIG. 1), the transmissive free-form surface lens 10 is used for a scanning distortion correcting unit. In this embodiment, a reflective free-form surface mirror 15 is used. The same components as those in FIG. 1 are designated the identical reference numbers, and the description is not repeatedly explained.

A combined light beam 24 emitted from laser light sources 1, 2, and 3 is reflected at a deflecting mirror device 9 to be a light beam 25. Suppose that an angle formed by the optical axes of the incident light beam 24 to the deflecting mirror device 9 and the emitted light beam 25 is ρ. The light beam 25 reflected at the deflecting mirror device 9 enters the free-form surface mirror 15 for correcting scanning distortion, and the light beam 25 is reflected to be a reflected light beam 27, and projected toward a screen 11. Suppose that an angle formed by the optical axes of the incident light beam 25 to the free-form surface mirror 15 and the emitted light beam 27 is φ.

In this embodiment, although the light beam is reflected twice, both of the angles ρ and φ in reflections are set to an angle of about 45°, whereby the light beam 24 (in the X-axis direction) entering from the laser light source side is converted into the light beam 27 (in the Y-axis direction) nearly orthogonal to the light beam 24, and emitted to the screen 11. In the deflecting mirror device 9, a deflecting mirror in the device is caused to periodically and repeatedly rotate and operate only at a predetermined angle (a deflection angle), whereby the light beam 27 to be projected on the screen 11 is two-dimensionally scanned in the horizontal direction (in the X-direction) and the vertical direction (the Z-direction) for displaying an image.

The free-form surface mirror 15 according to this embodiment has the reflection surface shape in a free-form surface shape with a predetermined aspheric surface shape asymmetric to the center of the reflection surface. Thus, scanning distortion caused by the two-dimensional scanning of the light beam by the deflecting mirror device 9 is excellently reduced. Next, the shape of the reflection surface of the free-form surface mirror 15 for correcting scanning distortion will be described.

Figure 7:
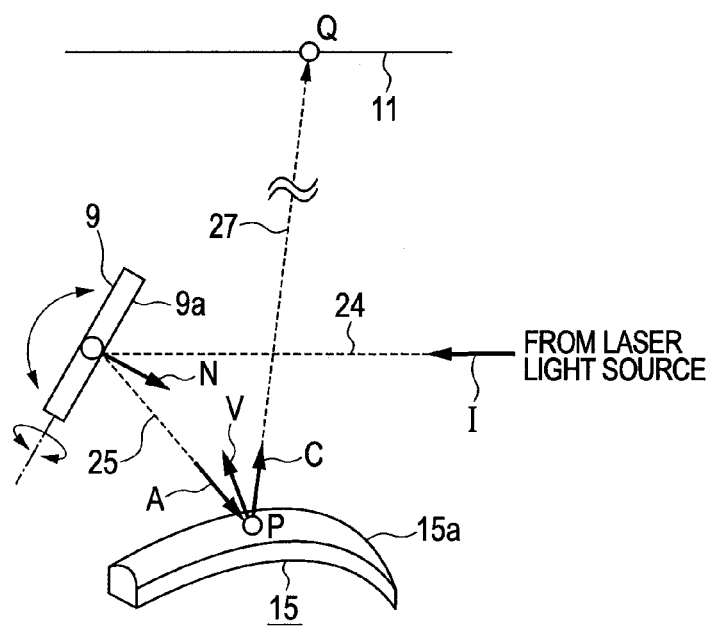
FIG. 7 is a diagram illustrating an analytic model for designing the shape of the reflection surface of a free-form surface mirror 15.

FIG. 7 is a diagram illustrating an analytic model for designing the shape of the reflection surface of the free-form surface mirror 15. First, suppose that the light beam vector of the light beam 24 entering a deflecting mirror surface 9a of the deflecting mirror device 9 is I, and the plane normal vector of the deflecting mirror surface 9a is N. The light beam vector A of the light beam 25 that is reflected at this deflecting mirror is expressed by Equation (4) as similar to Equation (1).

$$A = I - 2 \cdot (I^*N) \cdot N \quad (4)$$

Subsequently, the light beam 25 that is expressed by the light beam vector A and reflected at the deflecting mirror device 9 goes to the free-form surface mirror 15, and enters a point P on a reflection surface 15a. Suppose that the plane normal vector at the point P on the reflection surface 15a is V, the light beam vector C of the light beam reflected at this point P is expressed by Equation (5).

$$C = A - 2 \cdot (A^*V) \cdot V \quad (5)$$

Thus, from Equations (4) and (5), the light beam vector C of the light beam 27 that is reflected at the free-form surface mirror 15 and goes to the screen 11 can be found by the light beam vector I entering the deflecting mirror device 9, the plane normal vector N from the deflecting mirror surface 9a of the deflecting mirror device 9, and the plane normal vector V from the reflection surface 15a of the free-form surface mirror 15. If this light beam vector C is found, a position Q on the screen 11 is also found, at which the light beam 27 traveling along the light beam vector C arrives.

Here, in an ideal scanning state without scanning distortion, the relationship between the rotation angle (that is, the plane normal vector N from the deflecting mirror surface 9a of the deflecting mirror device 9) given to rotation axes 30 and 31 of the deflecting mirror device 9 and the coordinates of the target point Q at which the light beam 27 arrives on the screen 11 (that is, the light beam vector C of the light beam 27) is separately defined. Thus, the relationship between the plane normal vector N and the light beam vector C in the ideal state is substituted into Equations (4) and (5), and the plane normal vector V from the free-form surface mirror 15 is calculated backward so as to satisfy these equations. Therefore, the plane normal vector V at the corresponding incident point P on the free-form surface mirror 15 to a given target point Q on the screen 11 (that is, the slope value of the reflection surface 15a) can be found. Then, if the coordinates of the target point Q on the screen 11 and the conditions of the rotation angles of the deflecting mirror device 9 for the coordinates are in turn given, the slope value is in turn obtained at the corresponding incident point on the free-form surface mirror 15. These slope values are in turn integrated as the scan center of the screen 11 is the origin point, whereby the shape of the reflection surface 15a of the free-form surface mirror 15 can be finally determined.

The free-form surface mirror 15 thus determined is used, whereby scanning distortion can be excellently reduced and asymmetric distortion in the screen can also be eliminated as similar to the case of the first embodiment. As described above, according to this embodiment, it is possible to excellently correct scanning distortion using a single optical element, which is the free-form surface mirror 15, and it is possible to implement a small-sized optical beam scanning device that displays two-dimensional images in high quality at low cost.

It is noted that this embodiment is characterized in that a problem of color aberration caused by the wavelength dependence of the refractive index of a lens does not theoretically occur because the reflective free-form surface mirror 15 is used for a scanning distortion correcting unit, as compared with the first embodiment using the transmissive free-form surface lens.

Third Embodiment

This embodiment is different from the first embodiment in that a wedge prism 12 is disposed instead of the free-form surface lens 10 illustrated in FIG. 1 and this wedge prism 12 is an optical prism for correcting image distortion.

Figure 8:
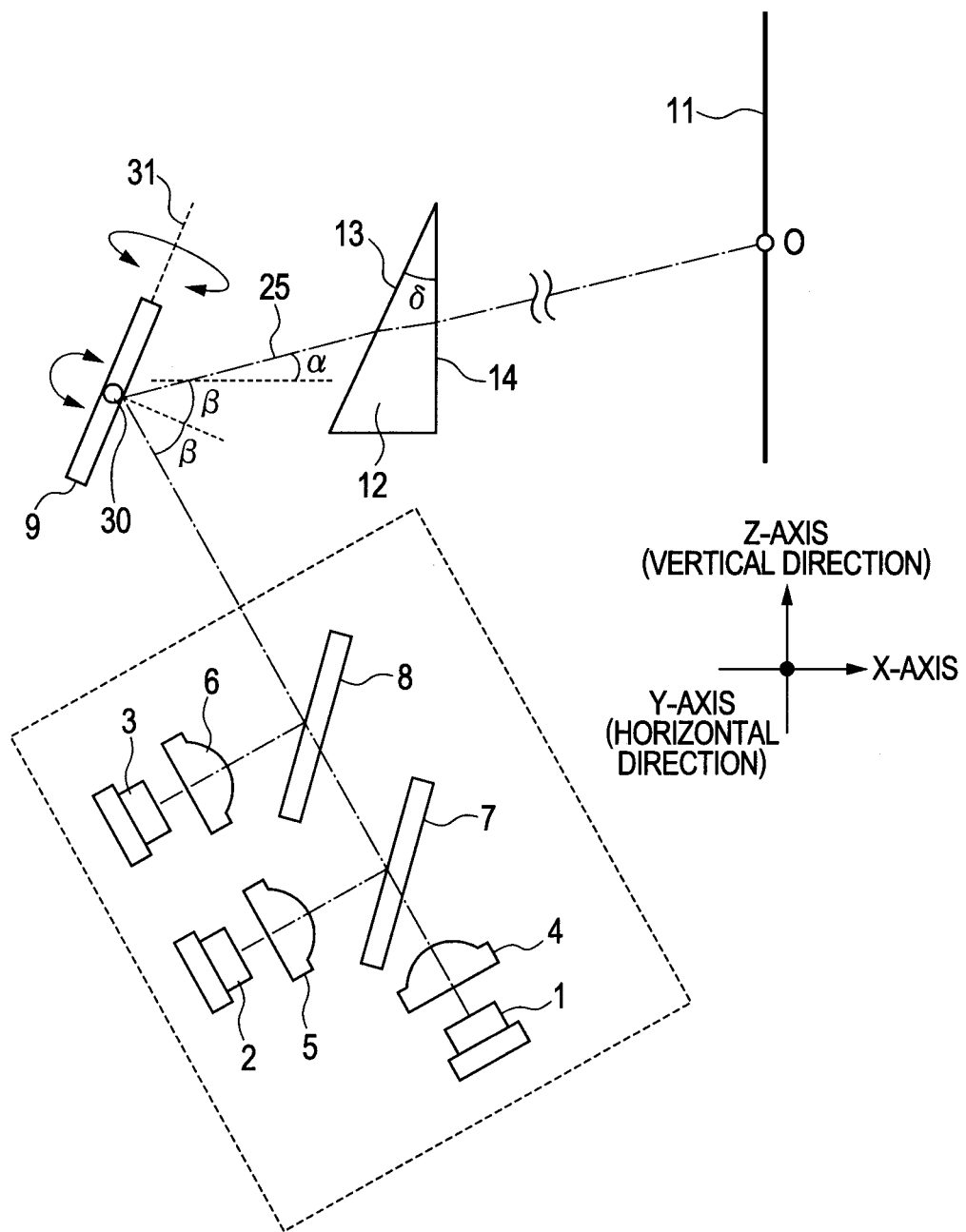
FIG. 8 is a schematic side view illustrating a third embodiment of an optical beam scanning image display device according to the present invention.

FIG. 8 is a diagram illustrating an optical beam scanning image display device in the case where the wedge prism 12 is disposed instead of the free-form surface lens according to the first embodiment. The same components as those in the first embodiment of the present invention illustrated in FIG. 1 are designated the identical reference numbers.

It is noted that in this embodiment, as shown in FIG. 8, in the disposed wedge prism 12 for correcting image distortion, a relative slope angle formed by an optical surface 13 on the light beam incident side and an optical surface 14 on the light beam emitting side is defend as a prism vertical angle δ, and the optical surface 14 on the light beam emitting side is disposed nearly in parallel with the vertical direction (the Z-axis direction in FIG. 8).

In the following, the specific configuration of this prism for correcting image distortion and the effect of image distortion correction will be described. First, a problem of image distortion in a conventional optical beam scanning image display device with no image distortion correcting unit according to the present invention will be described.

Figure 9:
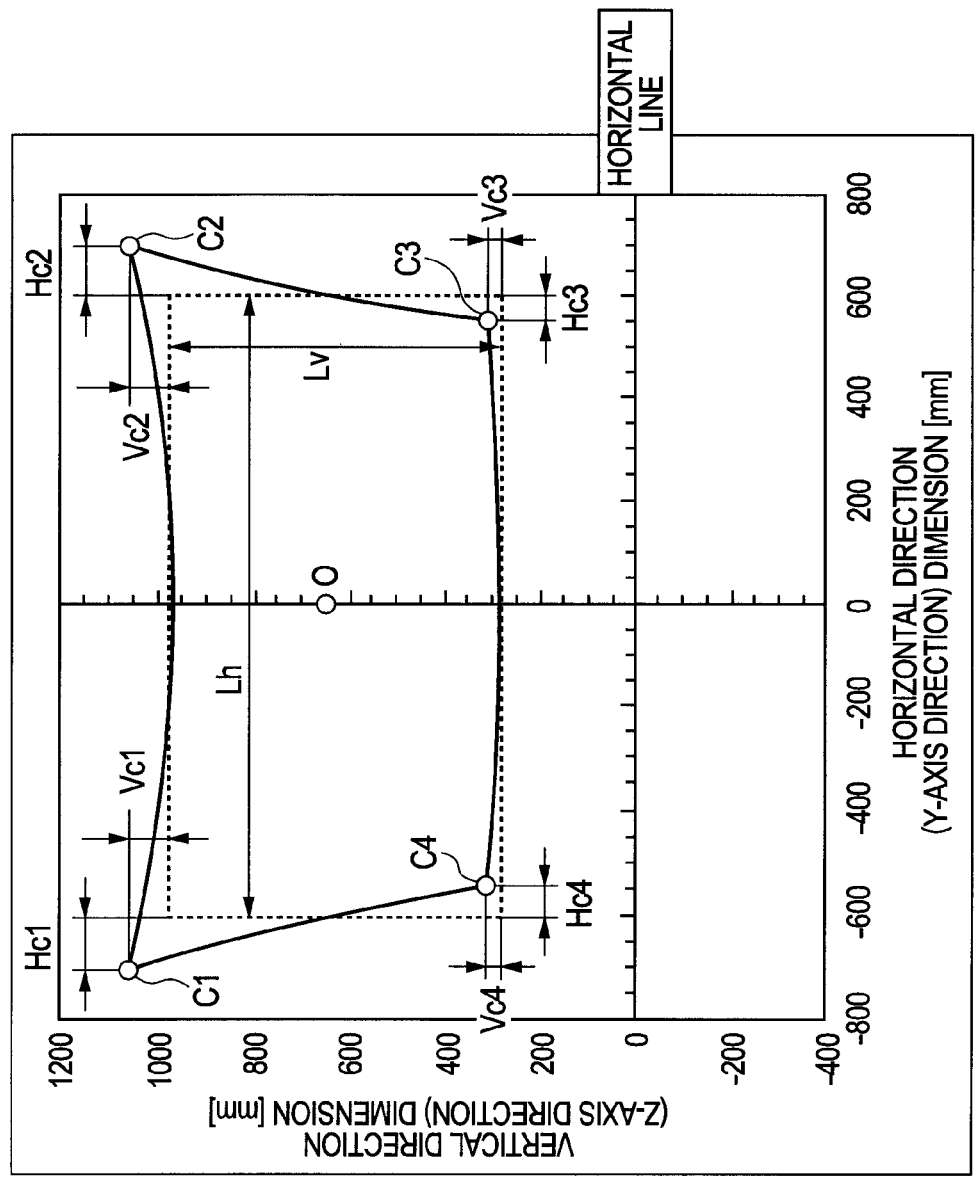
FIG. 9 is a plan view illustrating an exemplary image projected using a conventional optical beam scanning image display device.

For example, FIG. 9 is a diagram illustrating an actually depicted image that is reproduced by computer simulation in the case where a deflecting mirror device 9 for light beam scanning is used, which includes a function to repeatedly operate a reflecting mirror for deflection at high speed at a deflection angle of about ±14° in the horizontal direction and a deflection angle of about ±7° in the vertical direction, and a simple rectangular frame is displayed on a projection screen 11 having a screen surface parallel with the vertical direction at a location one meter apart from this deflecting mirror device 9.

It is noted that in reproducing and displaying the image by computer simulation, simulation was performed in which the incident angle of an incident light beam to a reflecting mirror surface (β in FIG. 8) is an angle of 15° in the case where the light beam entering the deflecting mirror device 9 is parallel with the horizontal direction (the X-axis direction in FIG. 8) and in the initial state, that is, in the state in which the reflecting mirror in the deflecting mirror device 9 is in a neutral state. In this case, the elevation angle (α in FIG. 8) of an initial reflected light beam 25 from the horizontal direction (the X-axis direction in FIG. 8) is an angle of 30°, the initial reflected light beam 25 being reflected at the deflecting mirror device 9 and going to the origin point O on the projection screen 11.

Moreover, in order to reproduce the performance of the conventional optical beam scanning image display device, FIG. 9 illustrates an image in the case of providing no unit for correcting image distortion at all. In FIG. 9, the horizontal axis expresses an image dimension in the horizontal direction (corresponding to the Y-axis direction in FIG. 8), and the vertical axis expresses an image dimension in the vertical direction (corresponding to the Z-axis direction in FIG. 8).

Furthermore, a solid line in FIG. 9 indicates a rectangular frame image actually displayed, and a broken line indicates an ideal rectangular frame image originally displayed.

As apparent from FIG. 9, the rectangular frame image that the deflecting mirror device 9 two-dimensionally scans the light beam for display is a trapezoid because the lengths of the top side and the base, for example, are different, and the sides to be originally drawn in straight lines are arc shaped curves.

As a result, a large distortion occurs in the displayed image, and the display positions of vertices C1, C2, C3, and C4 at four corners of the displayed rectangular frame are greatly shifted from ideal display positions, that is, the positions of vertices at four corners of the ideal rectangular frame image indicated by broken lines.

If there is such a large image distortion, the shape of the displayed image is of course not correctly displayed, and image quality is greatly degraded. Thus, desirably, such image distortion is eliminated or corrected as much as possible.

Therefore, first, evaluation parameters for quantitatively grasping the size of such image distortion are defined as follows. Namely, as illustrated in FIG. 9, in the shift values of the vertices C1, C2, C3, and C4 at four corners of the rectangular frame image from the ideal display positions, shift components in the horizontal direction are expressed by Hc1, Hc2, Hc3, and Hc4, and shift components in the vertical direction are expressed by Vc1, Vc2, Vc3, and Vc4. The shift components are then divided by a horizontal width Lh or a vertical width Lv of the ideal rectangular frame image, and the shift components are expressed by a ratio to the display width of the ideal rectangular frame. A root mean square (abbreviated to a RMS value) D of the ratio of each shift components is defined: i.e., $$D = \mathrm{SQRT}[(Hc1/Lh)^2 + (Hc2/Lh)^2 + (Hc3/Lh)^2 + (Hc4/Lh)^2 + (Vc1/Lv)^2 + (Vc2/Lv)^2 + (Vc3/Lv)^2 + (Vc4/Lv)^2] \quad (6)$$

The distortion factor RMS value D expressed by Equation (6) is used, whereby the size of image distortion to occur can be grasped quantitatively. Namely, an image with a larger value of this distortion factor RMS value D has a larger image distortion, whereas a displayed image with the value D closer to zero becomes an ideal displayed image with a smaller image distortion. For example, the distortion factor RMS value D of the image displayed using the conventional image display device illustrated in FIG. 9 is about 8.4%.

In the present invention, for an optical unit that significantly reduces this distortion factor RMS value D and excellently eliminates or corrects the image distortion of the displayed image, the wedge prism 12 for correcting image distortion (in the following, referred to as a distortion correcting prism for simplicity) is disposed in the optical path of the reflected light beam between the deflecting mirror device 9 for light beam scanning and the projection screen 11 as illustrated in FIG. 8.

Figure 10:
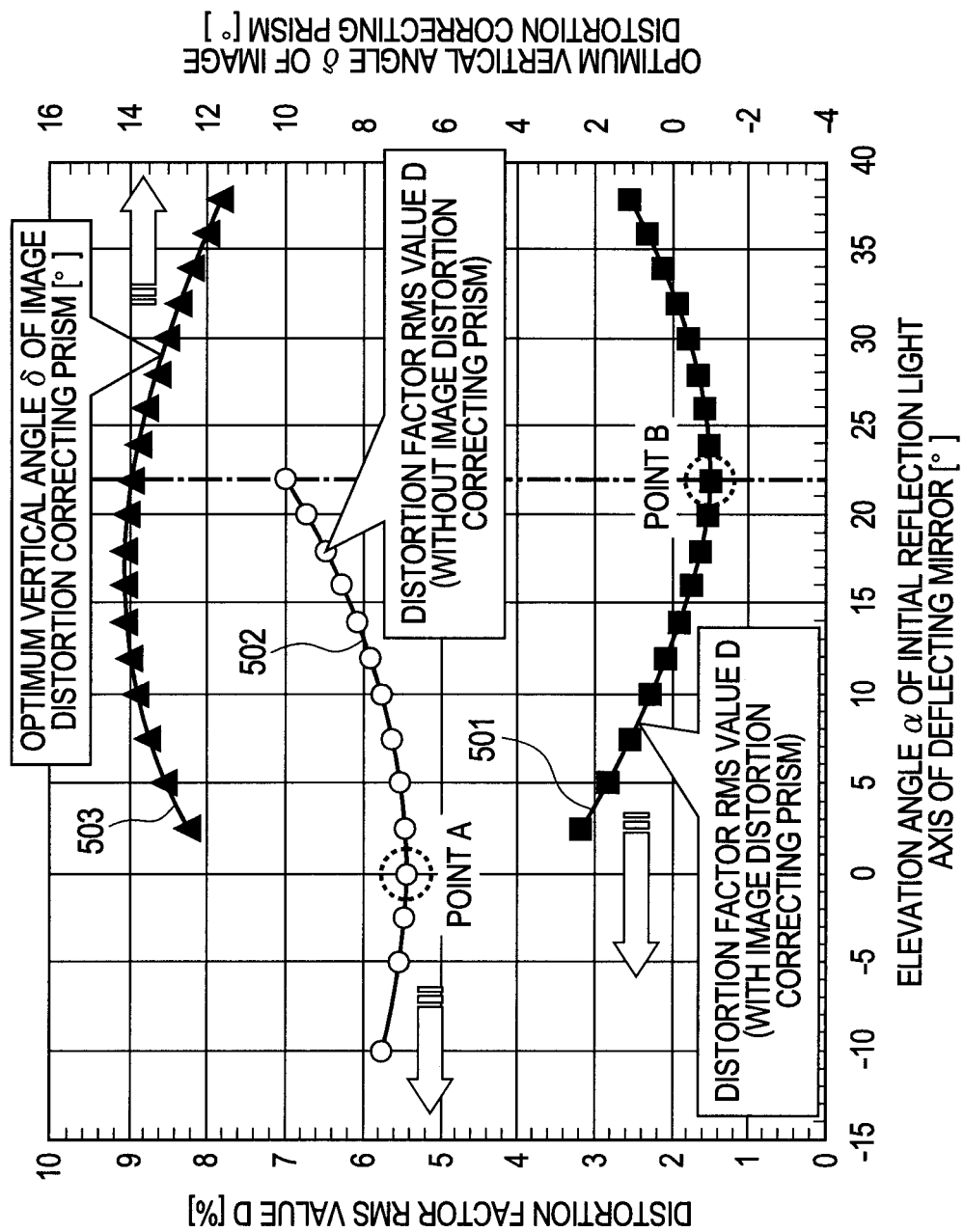
FIG. 10 is a diagram illustrating an exemplary relationship between the elevation angle of an initial reflection light axis from a deflecting mirror, a distortion factor RMS value D, and an optimum vertical angle $\delta$ of an image distortion correcting prism.

FIG. 10 is a graph plotting the relationship between the elevation angle α of the optical axis of the initial reflected light beam 25, which is emitted from the deflecting mirror device 9, from the horizontal direction (the X-axis direction in FIG. 8) and the distortion factor RMS value D in FIG. 8 in the case where the distortion correcting prism 12 is disposed as in the present invention and in the case where no image distortion correcting unit is disposed at all as in the conventional device. A line 501 in FIG. 10 expresses the case where the distortion correcting prism 12 according to the present invention is disposed, and a line 502 expresses the case where no image distortion correcting unit is disposed at all.

Moreover, in the case where the distortion correcting prism 12 is disposed, the optimum prism vertical angle δ of the distortion correcting prism 12 for the distortion factor RMS value D to take a minimum value Dmin is searched for plotting the minimum value Dmin, and the value of the optimum prism vertical angle δ is also plotted as a line 503 in the same graph.

It is noted that in FIG. 10, the initial incident angle β of the light beam entering the reflecting mirror in the deflecting mirror device 9 is supposed to be an angle of 15° the same as the case of FIG. 9.

Furthermore, suppose that the distortion correcting prism 12 used in FIG. 10 is made of BK-7 (refractive index nd=1.51633) that is a glass material for a typical optical component.

As apparent from FIG. 10, the distortion factor RMS value D is changed depending on the initial elevation angle α of the reflected light beam emitted from the deflecting mirror device 9 regardless of the presence or absence of the distortion correcting prism 12, and takes the minimum value at a predetermined elevation angle individually.

For example, in the case of the conventional configuration without the distortion correcting prism 12, the value D takes a minimum value of 5.4% at a point A on the line 502, that is, at an elevation angle α=0°.

On the other hand, in the case of disposing the distortion correcting prism 12, the value D is obviously reduced as expressed by the line 501 as compared with the conventional configuration without the distortion correcting prism 12. Moreover, in this case, the value D takes the minimum value at a point B in FIG. 10, that is, near a point at the initial elevation angle α=22°, and the minimum value is about 1.5%.

In other words, the distortion correcting prism 12 is disposed as illustrated in the embodiment in FIG. 8, and the elevation angle is set to the optimum angle, whereby the distortion factor RMS value D can be significantly reduced to about 30% of the distortion factor RMS value D in the conventional configuration.

It is noted that the optimum vertical angle δ of the distortion correcting prism 12 for the value D to take the minimum value about 1.5% is an angle of about 14°. Moreover, as the result of study by computer simulation, it is known that the distortion factor RMS value D is 2.0% or less for sufficiently eliminating image distortion if the vertical angle δ of the distortion correcting prism 10 is in the range of an angle of 14° plus or minus 3°.

Figure 11:
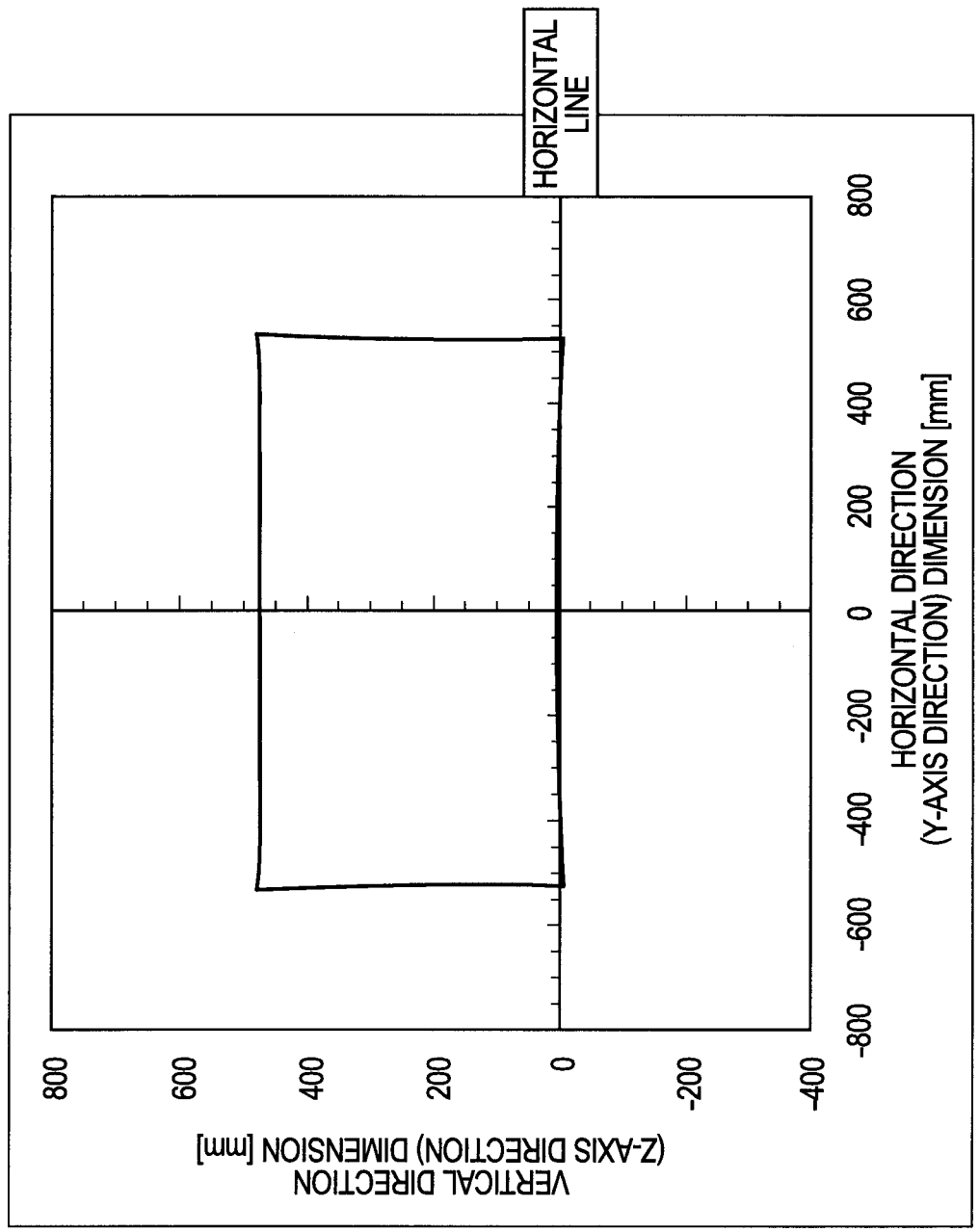
FIG. 11 is a plan view illustrating an exemplary image projected using an optical beam scanning image display device mounted with an image distortion correcting prism according to the present invention.

FIG. 11 is a diagram illustrating a rectangular frame image, which is depicted on the projection screen 11, reproduced by computer simulation in the case where a distortion correcting prism 12 with the prism vertical angle δ=14° as described above is disposed in the reflection optical path from the deflecting mirror device 9 and the initial elevation angle α is set at an angle of 22°. It is noted that the conditions other than the aforementioned parameters were the same as the conditions in FIG. 9.

As apparent from the comparison of FIG. 11 with FIG. 9, the distortion correcting prism 12 is disposed in the reflection optical path, and the design of the initial elevation angle α and the prism vertical angle δ of the optical axis of the reflected light beam 25 entering the prism is optimized, whereby it is possible to significantly reduce image distortion to occur, and to obtain image quality almost equivalent to an ideal displayed image.

The optimum value of the initial elevation angle α of the optical axis of the reflected light beam 25, which makes the distortion factor RMS value D to take the minimum value, and the optimum vertical angle δ of the distortion correcting prism 12 are changed depending on the initial incident angle β of the light beam entering the reflecting mirror in the deflecting mirror device 9.

Figure 12:
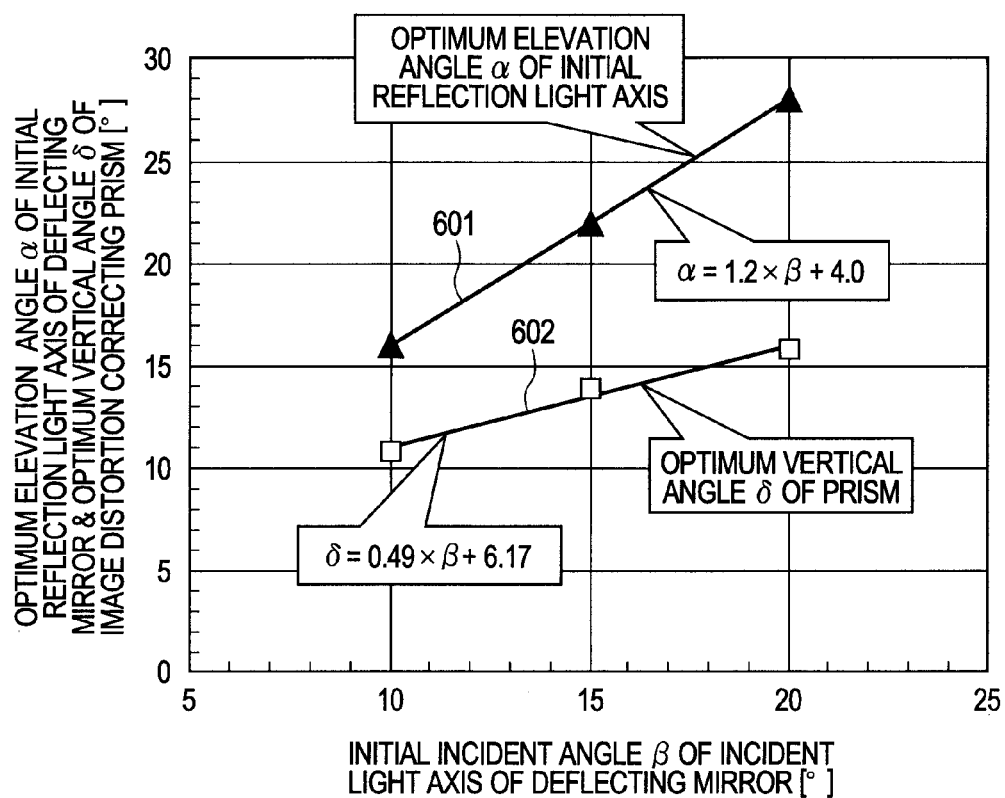
FIG. 12 is a diagram illustrating an exemplary relationship between the initial incident angle of the incident light axis of the deflecting mirror, the optimum elevation angle of the initial reflection light axis of the deflecting mirror, and the optimum vertical angle $\delta$ of the image distortion correcting prism.

FIG. 12 is a graph plotting the relationship between the initial incident angle β of the incident light beam, the optimum value of the initial elevation angle α of the reflected light beam, which makes the distortion factor RMS value D to take the minimum value, and the optimum vertical angle δ of the distortion correcting prism 12. The horizontal axis in FIG. 12 expresses the initial incident angle β, and the vertical axis expresses the optimum value of the initial elevation angle α and the optimum vertical angle δ of the distortion correcting prism. It is noted that the conditions other than the conditions described above are the same as the conditions set in FIGS. 8 to 11.

A line 601 in FIG. 12 expresses the relationship between the initial incident angle β and the optimum value of the initial elevation angle α, and a line 602 expresses the relationship between the initial incident angle β and the optimum vertical angle δ of the distortion correcting prism.

Both lines are almost straight lines, showing that the initial incident angle β is almost proportional to the initial elevation angle α and the initial incident angle β is almost proportional to the optimum vertical angle δ. Moreover, equations expressing the straight lines are described in FIG. 12.

Namely, in this embodiment described with reference to FIGS. 8 to 11, the case is described where the initial incident angle β is an angle of 15°. However, of curse, it is possible to also apply the present invention to the case where the initial incident angle β is a value other than an angle of 15°. The optimum value of the initial elevation angle α of the reflected light beam and the optimum vertical angle δ of the distortion correcting prism 12 in this applying can be easily calculated using the results illustrated in FIG. 12, for example.

Moreover, in this embodiment described with reference to FIGS. 8 to 12, it is assumed that BK-7, which is a glass material for a typical optical component, is used for a glass material to form the distortion correcting prism 12. However, no problem arises if the prism is made using a glass material other than BK-7.

Generally, the refractive index of the glass material is changed delicately according to the wavelength of the incident light beam. There is a parameter called a refractive index distribution value or the Abbe number expressing the size of a change in the wavelength. A glass material with a larger Abbe number has a smaller refractive index distribution value, and has a smaller rate of change in the refractive index to the wavelength of the incident light beam. As a result, in refracting an incident light beam at the prism, a change in the refraction angle, which occurs due to a difference in the refractive index caused according to the wavelength of the incident light beam, can also be suppressed to a small change.

Therefore, for example, the distortion correcting prism 12 is made using a glass material with a larger Abbe number than that of BK-7, that is, a glass material with a smaller refractive index distribution value, whereby it is possible to reduce a relative shift in the refraction angle of red, green, and blue image display light beams that enter the distortion correcting prism and are refracted at the prism. As a result, it is possible to suppress a relative pixel shift (a color shift) of the three primary colors on the projection screen as small as possible.

It is noted that in this case, since the refractive index of the glass material newly used of course has a refractive index different from the refractive index of BK-7 (nd=1.51633), the optimum value of the initial elevation angle α of the optical axis of the reflected light beam and the value of the optimum vertical angle δ of the distortion correcting prism 12 are also values different from the values of the distortion correcting prism made using BK-7 in consequence.

Moreover, in this embodiment described with reference to FIGS. 8 to 12, the explanation is given to the limited example in which the distortion correcting prism 12 is a wedge prism with a predetermined vertical angle δ and the prism is disposed in the orientation in such a way that the optical surface on the light beam emitting side (the surface 14 in FIG. 8) is nearly in parallel with the vertical direction (the Z-axis direction in FIG. 8). However, of course, the prism is not limited to prisms in this shape and arrangement. No problem arises in prisms in any shapes and arrangements if the prisms are optical prisms with a predetermined vertical angle δ between the optical surface on the light beam incident side (corresponding to the surface 13 in FIG. 8) and the optical surface on the light beam emitting side (corresponding to the surface 14 in FIG. 8).

In the following, another exemplary configuration of the distortion correcting prism 12 is introduced in a fourth embodiment.

Fourth Embodiment

Figure 13:
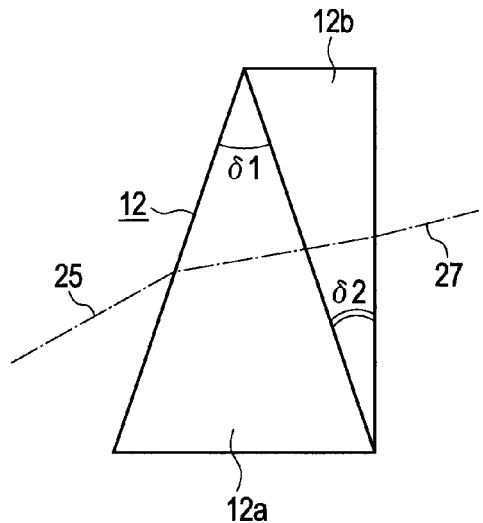
FIG. 13 is a schematic side view illustrating a fourth embodiment of an image distortion correcting prism according to the present invention.

FIG. 13 is a schematic side view illustrating a prism main body showing the fourth embodiment of the distortion correcting prism 12 according to the present invention. It is noted that since an optical beam scanning device and an image display device according to this embodiment include the same components as those in the embodiment in FIG. 8 other than the distortion correcting prism 12, the illustration and the detailed description are omitted.

A distortion correcting prism 12 according to this embodiment is a compound prism formed of at least two kinds of glass materials with a refractive index or a refractive index distribution value different from each other or the Abbe number different from each other, in which a first wedge prism 12a with a predetermined vertical angle δ1 is bonded to a second wedge prism 12b with a predetermined vertical angle δ2 as illustrated in FIG. 13.

With such a configuration in which a plurality of prisms made of different glass materials are bonded to each other, it is possible to provide settings to compensate a relative shift in the refraction angle of red, green, and blue light beams for image display caused by the distribution characteristics of the refractive index of the individual prisms between the prisms with each other. As a result, it is possible to implement an excellent image distortion correction, and it is possible to reduce the relative pixel shift (the color shift) of the three primary colors on the projection screen 11, which cannot be completely eliminated using a single prism, to the degree that the relative pixel shift causes almost no problem on performance.

For example, in the case where a rectangular frame as illustrated in FIG. 11 is displayed, if a single wedge prism made only of the glass material BK-7 as described in the third embodiment of the present invention is disposed for the distortion correcting prism 12, the relative pixel shift (the color shift) of three primary colors, red, green, and blue, occurs about one millimeter at the maximum On the other hand, for example, this distortion correcting prism 12 is formed of a compound prism in which the first prism 12a with the vertical angle δ1=20° made of the glass material BK-7 (nd=1.51633 and the Abbe number Vd=64.1) is bonded to the second prism 12b with the vertical angle 62=14.5° made of a glass material L-LAH83 with a high refractive index and a high distribution (nd=1.864 and the Abbe number Vd=40.6) as illustrated in FIG. 13, whereby it is possible to reduce the relative pixel shift (the color shift) of three primary colors to 0.2 mm or less at the maximum.

It is noted that a compound prism that excellently reduces a so-called color shift using the configuration of the aforementioned compound prism is generally referred to as an achromatic prism. However, of course, the distortion correcting prism according to the present invention with such achromatic effect is not limited to the combination of the glass materials BK-7 and L-LAH83, and the distortion correcting prism can also be implemented by the combination of other glass materials.

However, in the case of the combination of other glass materials, since the combination of the optimum prism vertical angles that the effect of image distortion correction becomes the best effect is of course changed depending on the refractive indices of individual glass materials and the combination of glass materials, the design method disclosed in the present invention, for example, has to be used to optimize design.

It is noted that such a configuration may be possible in which the image distortion correcting prism as described above is disposed at a light beam emission opening of an optical beam scanning device and an image display device using the same, for example, and the opening is sealed with this prism so as not to allow dust and dirt to enter the device, whereby this image distortion correcting prism also serves as a dustproof transparent window member.

Fifth Embodiment

Figure 14:
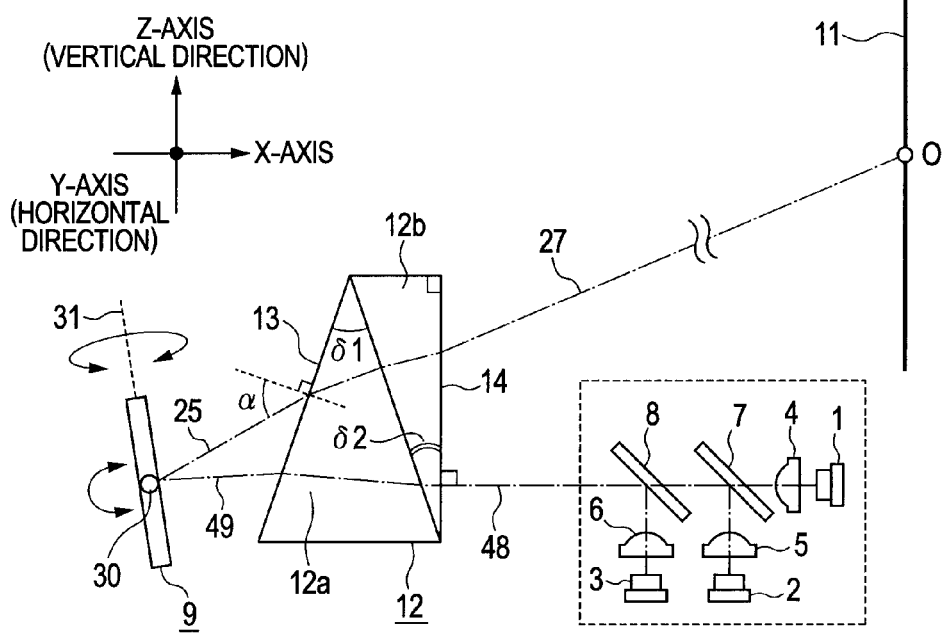
FIG. 14 is a schematic side view illustrating a fifth embodiment of an image distortion correcting prism according to the present invention and an optical beam scanning image display device mounted with the image distortion correcting prism.

FIG. 14 is a schematic side view illustrating another embodiment of the optical beam scanning device and the image display device using the same according to the present invention. It is noted that an alternate long and short dash line in FIG. 14 expresses the optical axis of a light beam. Moreover, in FIG. 14, the same components as those in the third embodiment of the present invention illustrated in FIG. 8 are designated the identical reference numbers.

This embodiment includes the following configuration characteristic different from the third embodiment of the present invention illustrated in FIG. 8.

First, the first characteristic is in that a compound prism formed of two wedge prisms bonded to each other as illustrated in FIG. 13 is used for a prism for correcting image distortion. The two wedge prisms are made of predetermined glass materials with the refractive index or the refractive index distribution value different from each other.

For a specific example of the configuration and shape of the glass materials, a first prism 12a constituting a compound distortion correcting prism 12 in FIG. 14 is made of a glass material, BK-7 for the glass material name, (the refractive index nd=1.51633 and the Abbe number Vd=64.1), and the angle of a vertical angle δ1 of the first prism 12a is an angle of 20°.

On the other hand, a second prism 12b constituting the compound distortion correcting prism 12 is made of a glass material, N-F2 for the glass material name (the refractive index nd=1.62004 and the Abbe number Vd=36.3), and the angle of a vertical angle δ2 of the second prism 12b is an angle of 10°.

Subsequently, a second characteristic of this embodiment is in that the compound distortion correcting prism 12 is disposed immediately in front of a deflecting mirror device 9 in such a way that a going light beam that is emitted from a light source unit and enters the deflecting mirror device 9 for light beam scanning and a returning light beam that is reflected at the deflecting mirror device 9 and goes to a projection screen 11 are transmitted through the compound distortion correcting prism 12.

For a specific example of the arrangement, the center optical axis of a going light beam 48 emitted from the light source unit travels almost in the horizontal direction (in the direction nearly parallel with the X-axis in FIG. 14), and first enters an incident surface 14 of the compound distortion correcting prism 12 in the direction nearly at a right angle, that is, in the direction in which the incident angle is about 0°. The going light beam 48 is in turn transmitted through the prisms 12b and 12a constituting the compound distortion correcting prism 12 in this order, and emitted from a surface 13.

Subsequently, the center axis of a going light beam 49 emitted from the compound distortion correcting prism 12 enters the deflecting mirror device 9 for light beam scanning, and is reflected at a reflecting mirror in this deflecting mirror device 9. The going light beam 49 then becomes a returning light beam 25, and again enters the compound distortion correcting prism 12 from the surface 13 side. The reflecting mirror in the deflecting mirror device 9 is disposed at a predetermined installation angle in such a way that an incident angle (an angle formed by the plane normal of a surface 13 and the center optical axis of the returning light beam 25) a of the center optical axis of the returning light beam 25 to the incident surface 13 is about an angle of 27° in this traveling, when the deflecting mirror device 9 is in the initial state (in the neutral state).

The returning light beam 25 that again enters the compound distortion correcting prism 12 from the incident surface 13 is then in turn transmitted through the prisms 12a and 12b constituting the compound distortion correcting prism 12 in this order. The returning light beam 25 is again emitted from a surface 14, and travels toward the projection screen 11 as a returning light beam 27.

As in this embodiment, with such a configuration in which the prism 12 for correcting distortion is a compound prism and the going light beam and the returning light beam enter the distortion correcting prism 12 nearly in the reverse directions, both of image distortion and a relative pixel shift (a color shift) in association with a difference in the wavelengths of three RGB primary colors on the projection screen 11 can be excellently compensated, and the distortion correcting prism 12 can be disposed immediately in front of the deflecting mirror device 9 for light beam scanning. Thus, it is possible to significantly downsize the optical beam scanning device according to the present invention or the image display device using the same in consequence.

It is noted that of course, the aforementioned specific parameters for the configuration, shape, and arrangement of the distortion correcting prism 12 according to the fifth embodiment of the present invention are merely examples, which are not limited thereto.

Any configurations may be possible as long as an optical beam scanning device or an image display device using the optical beam scanning device is an optical beam scanning device or an image display device using the optical beam scanning device with a compound distortion correcting prism formed of a plurality of prisms made of different glass materials, in which the distortion correcting prism is disposed in such a way that a going light beam that is emitted from a light source unit and enters a deflecting mirror device and a returning light beam that is reflected at this deflecting mirror device and goes to a projection screen are both transmitted through the distortion correcting prism.

Sixth Embodiment

FIG. 15 is a schematic side view illustrating still another embodiment of the optical beam scanning device and the image display device using the same according to the present invention. It is noted that an alternate long and short dash line in FIG. 15 expresses the optical axis of a light beam. Moreover, in FIG. 15, the same components as those in the embodiments of the present invention illustrated in FIGS. 8, 13, and 14 are designated the identical reference numbers.

This embodiment has the following configuration characteristic different from the third to fifth embodiments of the present invention as described above.

First, the first characteristic of this embodiment is in that two wedge prisms 12a and 12b constituting a distortion correcting prism 12 are disposed at positions apart from a predetermined distance. It is noted that as similar to the second and third embodiments, the wedge prisms 12a and 12b are made of predetermined glass materials with the refractive index or the refractive index distribution value different from each other.

Subsequently, the second characteristic of this embodiment is in that a going light beam that is emitted from a light source unit and enters a deflecting mirror device 9 for light beam scanning is transmitted through only one prism (the prism 12a in the example in FIG. 15) of the two wedge prisms constituting the distortion correcting prism 12 and then enters the deflecting mirror device 9, whereas a returning light beam that is reflected at the deflecting mirror device 9 and goes to a projection screen 11 is in turn transmitted through the two wedge prisms 12a and 12b.

FIG. 16 is a graph illustrating a specific exemplary configuration according to this embodiment and an exemplary optical performance of this embodiment.

For a specific exemplary configuration according to this embodiment, the case is assumed where the first wedge prism 12a is a prism in an isosceles triangular shape with a vertical angle $\delta_1$ using a glass material generally called BK-7 for the glass material name (the refractive index nd=1.51633 and the Abbe number Vd=64.1) and the second wedge prism 12b is a prism in a right-angled triangular shape with a vertical angle $\delta_2$ using a glass material generally called N-F2 for the glass material name (the refractive index nd=1.62004 and the Abbe number Vd=36.3. As illustrated in FIG. 15, a vertical surface is disposed opposite the deflecting mirror device 9.

FIG. 16 is a graph plotting the relationship between parameters in the case where these two wedge prisms are used to form the distortion correcting prism 12, in which the horizontal axis expresses the vertical angle $\delta_1$ of the first wedge prism 12a, and the vertical axis expresses, at each vertical angle $\delta_1$, the optimum angle of the vertical angle $\delta_2$ of the second wedge prism 12b for the distortion factor RMS value D to take the minimum value, the value of the distortion factor RMS value D at this time, and the maximum value of a relative pixel shift (a color shift) value on the projection screen 11 in association with a difference in the wavelengths of three RGB primary colors.

It is noted that in FIG. 16, the distance from the optical beam scanning device mounted with the deflecting mirror device 9 and the distortion correcting prism 12 to the projection screen 11 is supposed to be 40 cm.

Moreover, the reflecting mirror provided in the deflecting mirror device 9 two-dimensionally swings at a deflection angle of about ±14° in the horizontal direction and a deflection angle of about ±7° in the vertical direction, and the reflecting mirror is disposed nearly in parallel with the vertical direction in the initial state as similar to the case in FIG. 9. Furthermore, the incident angle $\beta$ of the going light beam entering the deflecting mirror device 9 is defined as an angle of 15° in the initial state.

It is noted that as described above, in order to define the incident angle $\beta$ of the going light beam entering the deflecting mirror device 9 as an angle of 15°, an incident angle $\gamma$ of the going light beam that is emitted from the light source unit and enters the first wedge prism 12a has to be set to the optimum angle according to the value of the vertical angle $\delta_1$ of the first wedge prism 12a.

Moreover, the maximum value of a relative pixel shift (a color shift) value on the projection screen 11 expresses a relative pixel shift remaining at four corners of an image in the case where the slope of the optical axis is adjusted in the initial state of RGB light beams in order to make a relative pixel shift in the center part of the image zero and then the reflecting mirror provided in the deflecting mirror device 9 is caused to operate for two-dimensional deflection for forming the image, that is, the maximum value of a remaining color shift value. Furthermore, in order to make the graph to be easily seen, FIG. 16 plots a value ten times the maximum value of the remaining pixel shift (the color shift) value.

As apparent from FIG. 16, the vertical angle $\delta_1$ of the first prism 12a and the optimum vertical angle $\delta_2$ of the second prism 12b fit to the vertical angle $\delta_1$ hold a proportional relationship therebetween, and the relationship is expressed by nearly the following relational expression (7):

$$\text{vertical angle } \delta_2 \text{ nearly equal } 0.94 \times \delta_1 + 14.5 \tag{7}$$

Moreover, in the case where the relationship between the vertical angle $\delta_1$ of the first wedge prism 12a and the vertical angle δ2 of the second wedge prism 12b satisfies the relationship of FIG. 16 or Expression (7), the image distortion factor RMS value D on the projection screen can be made 2% or less, if the vertical angle δ1 is about 35° or less. Furthermore, the maximum value of the remaining pixel shift values of the RGB light beams can be suppressed to 0.1 mm or less, if the vertical angle δ1 exists between angles of 25° to 30°.

As described above, with the configuration according to this embodiment, it is possible to excellently compensate both of image distortion and a relative pixel shift (a color shift) in association with a difference in the wavelengths of three RGB primary colors on the projection screen 11, as similar to the fourth and fifth embodiments, and it is possible to widen the degree of freedom for the design of arrangement of the light source unit, the deflecting mirror device 9 for light beam scanning, and the distortion correcting prism 12. Thus, it is possible to implement further downsizing the optical beam scanning device according to the present invention or the image display device using the same in consequence.

However, the relationship between the vertical angle δ1 of the first wedge prism 12a and the vertical angle δ2 of the second wedge prism 12b as illustrated in FIG. 9 and expressed by Expression (7) is merely examples of the configuration, shape, and arrangement of the distortion correcting prism 12 according to the fifth embodiment of the present invention, which are not of course limited thereto.

Namely, any configuration may be possible as long as an optical beam scanning device or an image display device using the optical beam scanning device is an optical beam scanning device or an image display device using the optical beam scanning device with an optical member for correcting image distortion formed of a plurality of wedge prisms made of glass materials with a predetermined vertical angle different from each other, in which the optical member is disposed in the optical path of a returning light beam that is at least reflected at a deflecting mirror device and goes to a projection screen.

What is claimed is:

1. An optical beam scanning device comprising:
a light source; and
a deflecting mirror device which includes a predetermined optical reflection surface to operate for repeated deflection in two directions nearly orthogonal to each other, the deflecting mirror device having a function to deflect and scan a light beam emitted from the light source and reflected at the optical reflection surface in a first scanning direction and a second scanning direction nearly orthogonal to the first scanning direction,
wherein a wedge optical prism or a trapezoid optical prism with a predetermined vertical angle made of transparent optical glass or optical component plastic with a predetermined refractive index is disposed in an optical path of the light beam reflected at the optical reflection surface.

2. The optical beam scanning device according to claim 1, wherein the vertical angle of the wedge optical prism or the trapezoid optical prism ranges from angles of 14° plus or minus 3°.

3. An optical beam scanning device comprising:
a light source; and
a deflecting mirror device which includes a predetermined optical reflection surface to operate for repeated deflection in two directions nearly orthogonal to each other, the deflecting mirror device having a function to deflect and scan a light beam emitted from the light source and reflected at the optical reflection surface in a first scanning direction and a second scanning direction nearly orthogonal to the first scanning direction,
wherein a compound prism is disposed in an optical path of the light beam reflected at the optical reflection surface, the compound prism being formed of a wedge or trapezoid first optical prism with a predetermined vertical angle made of transparent optical glass or optical component plastic with a predetermined refractive index and a predetermined Abbe number and a second optical prism with a predetermined vertical angle made of optical glass or optical component plastic with a predetermined Abbe number different from at least the Abbe number of the first optical prism, the first optical prism being bonded to the second optical prism.

4. An optical beam scanning device, wherein:
the wedge optical prism, the trapezoid optical prism, or the compound prism according to claim 1 is disposed at a light beam emission opening of the beam scanning device or an image display device using the beam scanning device; and
the prism also serves as a dustproof transparent window member by sealing the opening with the prism.

5. An optical beam scanning device comprising:
a light source; and
a deflecting mirror device which includes a predetermined optical reflection surface to operate for repeated deflection in two directions nearly orthogonal to each other, the deflecting mirror device having a function to deflect and scan a light beam emitted from the light source and reflected at the optical reflection surface in a first scanning direction and a second scanning direction nearly orthogonal to the first scanning direction,
wherein a compound prism is disposed at a position at which a going light beam and a returning light beam enter from in nearly reverse directions from each other, the going light beam being emitted from the light source and entering the optical reflection surface, the returning light beam being reflected at the optical reflection surface, the compound prism being formed of a wedge or trapezoid first optical prism with a predetermined vertical angle made of transparent optical glass or optical component plastic with a predetermined refractive index and a predetermined Abbe number and a second optical prism with a predetermined vertical angle made of optical glass or optical component plastic with a predetermined Abbe number different from at least the Abbe number of the first optical prism, the first optical prism being bonded to the second optical prism.

6. An optical beam scanning device comprising:
a light source; and
a deflecting mirror device which includes a predetermined optical reflection surface to operate for repeated deflection in two directions nearly orthogonal to each other, the deflecting mirror device having a function to deflect and scan a light beam emitted from the light source and reflected at the optical reflection surface in a first scanning direction and a second scanning direction nearly orthogonal to the first scanning direction;
wherein a wedge or trapezoid first optical prism with a predetermined vertical angle made of transparent optical glass or optical component plastic with a predetermined refractive index and a predetermined Abbe number and a second optical prism with a predetermined vertical angle made of optical glass or optical component plastic with a predetermined Abbe number different from at least the Abbe number of the first optical prism are disposed at positions apart from a predetermined distance;

wherein a going light beam emitted from the light source is transmitted through at least one of the first optical prism and the second optical prism, and then enters the optical reflection surface; and wherein a returning light beam reflected at the optical reflection surface is in turn transmitted through the first and second optical prisms.

7. An image display device comprising:

the optical beam scanning device according to claim 1.

8. The optical beam scanning device according to claim 6, wherein the vertical angle of the first optical prism ranges between angles of 25° to 30°.

* * * * *